(12) United States Patent
Kurian et al.

(10) Patent No.: US 12,326,836 B2
(45) Date of Patent: Jun. 10, 2025

(54) PRE-FETCH ENGINE WITH DATA EXPIRATION FUNCTIONALITY FOR MESH DATA NETWORK

(71) Applicant: Bank of America Corporation, Charlotte, NC (US)

(72) Inventors: Manu Kurian, Dallas, TX (US); Padmanabhan Iyer, Cos Cob, CT (US); Paul Roscoe, Treuddyn Flintshire (GB); Mahesh Bhashetty, Plainsboro, NJ (US)

(73) Assignee: Bank of America Corporation, Charlotte, NC (US)

( * ) Notice: Subject to any disclaimer, the term of this patent is extended or adjusted under 35 U.S.C. 154(b) by 146 days.

(21) Appl. No.: 18/115,827

(22) Filed: Mar. 1, 2023

(65) Prior Publication Data

US 2024/0296146 A1    Sep. 5, 2024

(51) Int. Cl.
*G06F 16/11* (2019.01)
*G06F 16/172* (2019.01)

(52) U.S. Cl.
CPC .......... *G06F 16/172* (2019.01); *G06F 16/125* (2019.01)

(58) Field of Classification Search
None
See application file for complete search history.

(56) References Cited

U.S. PATENT DOCUMENTS

| | | | |
|---|---|---|---|
| 6,901,489 B2 | 5/2005 | Gruner et al. | |
| 9,253,277 B2 | 2/2016 | Hughes et al. | |
| 9,773,069 B2 | 9/2017 | Teeraparpwong et al. | |
| 10,474,635 B1 | 11/2019 | Unger et al. | |
| 10,489,295 B2 | 11/2019 | Nellans et al. | |
| 2003/0009563 A1 | 1/2003 | Douglis et al. | |
| 2012/0011588 A1 | 1/2012 | Milener et al. | |
| 2012/0221720 A1 | 8/2012 | Trevino et al. | |
| 2014/0379839 A1 | 12/2014 | Dou | |
| 2021/0029192 A1 | 1/2021 | Varadarajan et al. | |
| 2022/0100768 A1* | 3/2022 | Wondo | G06N 20/00 |
| 2023/0060753 A1* | 3/2023 | Matsuoka | G06Q 10/063114 |

OTHER PUBLICATIONS

Meddeb, Maroua, et al., "Cache Freshness in Named Data Networking for the Internet of Things", 2018, The Computer Journal, vol. 61 No. 10, pp. 1496-1511. (Year: 2018).*

(Continued)

*Primary Examiner* — Scott A. Waldron
(74) *Attorney, Agent, or Firm* — Banner & Witcoff, Ltd.

(57) ABSTRACT

Arrangements for controlling data retrieval are provided. In some aspects, a data request may be received by a computing platform. A pre-fetch engine may be executed to analyze the data request and generate, using a machine learning model, a pre-fetch template identifying data sets responsive to the request. The pre-fetch template may be transmitted to one or more data repositories and response data sets including data use parameters may be received. The received plurality of data sets may be analyzed to determine whether a triggering action has occurred. If a triggering action has occurred, one or more data modification functions may be performed. For instance, data may be deleted, prevented from further processing, or the like, in response to detection of a triggering action.

21 Claims, 18 Drawing Sheets

(56) References Cited

OTHER PUBLICATIONS

Banerjee, Supratik & S. K. Biswash, "Freshness Management of Cache Content in Information-Centric Networking," 2019 IEEE International Conference on Advanced Networks and Telecommunications Systems (ANTS), pp. 1-6. (Year: 2019).*

Feb. 20, 2024—(US) Non-Final Office Action—U.S. Appl. No. 18/115,823.

Jul. 31, 2023—(US) Notice of Allowance—U.S. Appl. No. 18/115,820.

Oct. 9, 2024—(US) Notice of Allowance—U.S. Appl. No. 18/115,823.

* cited by examiner

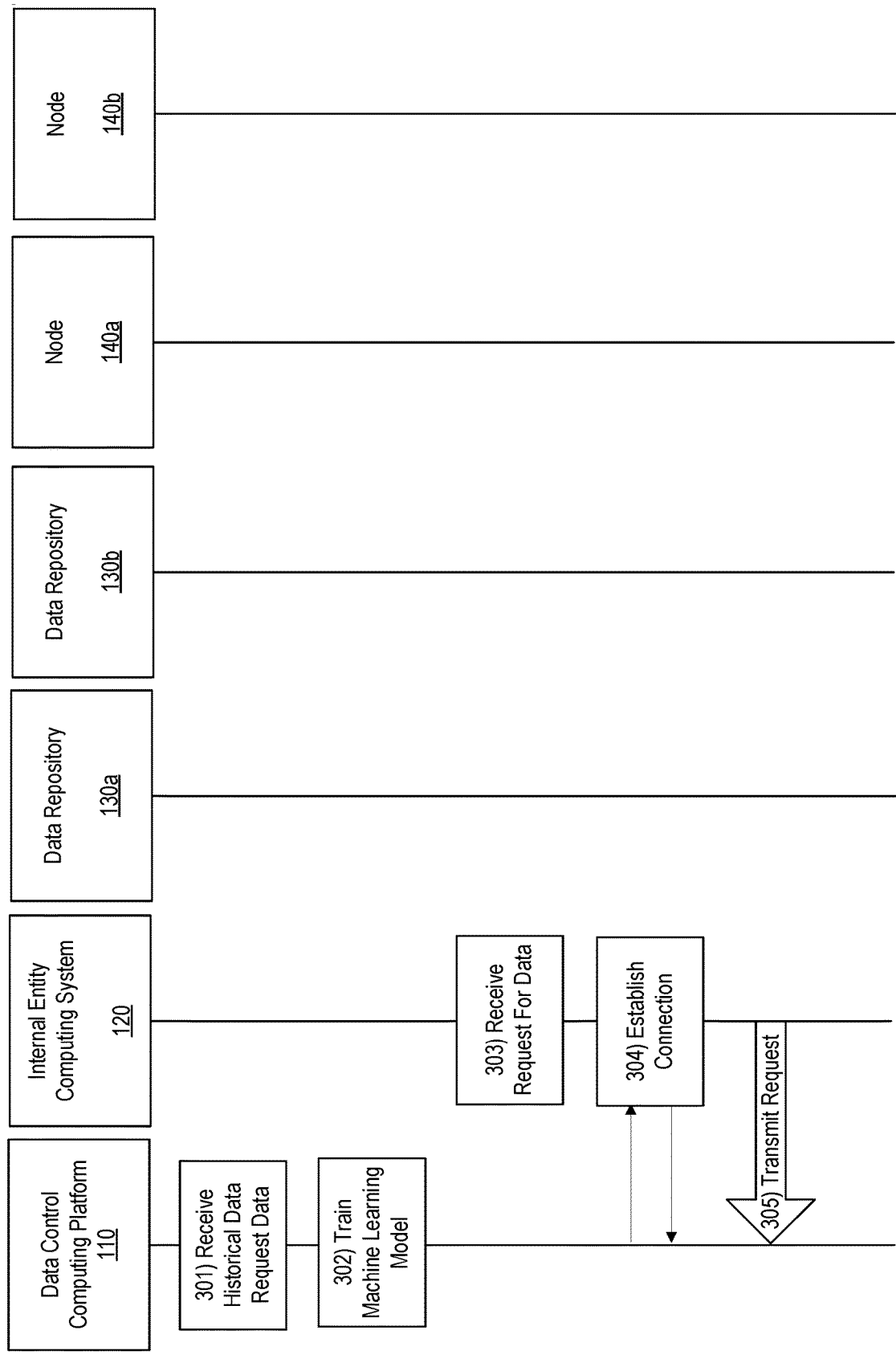

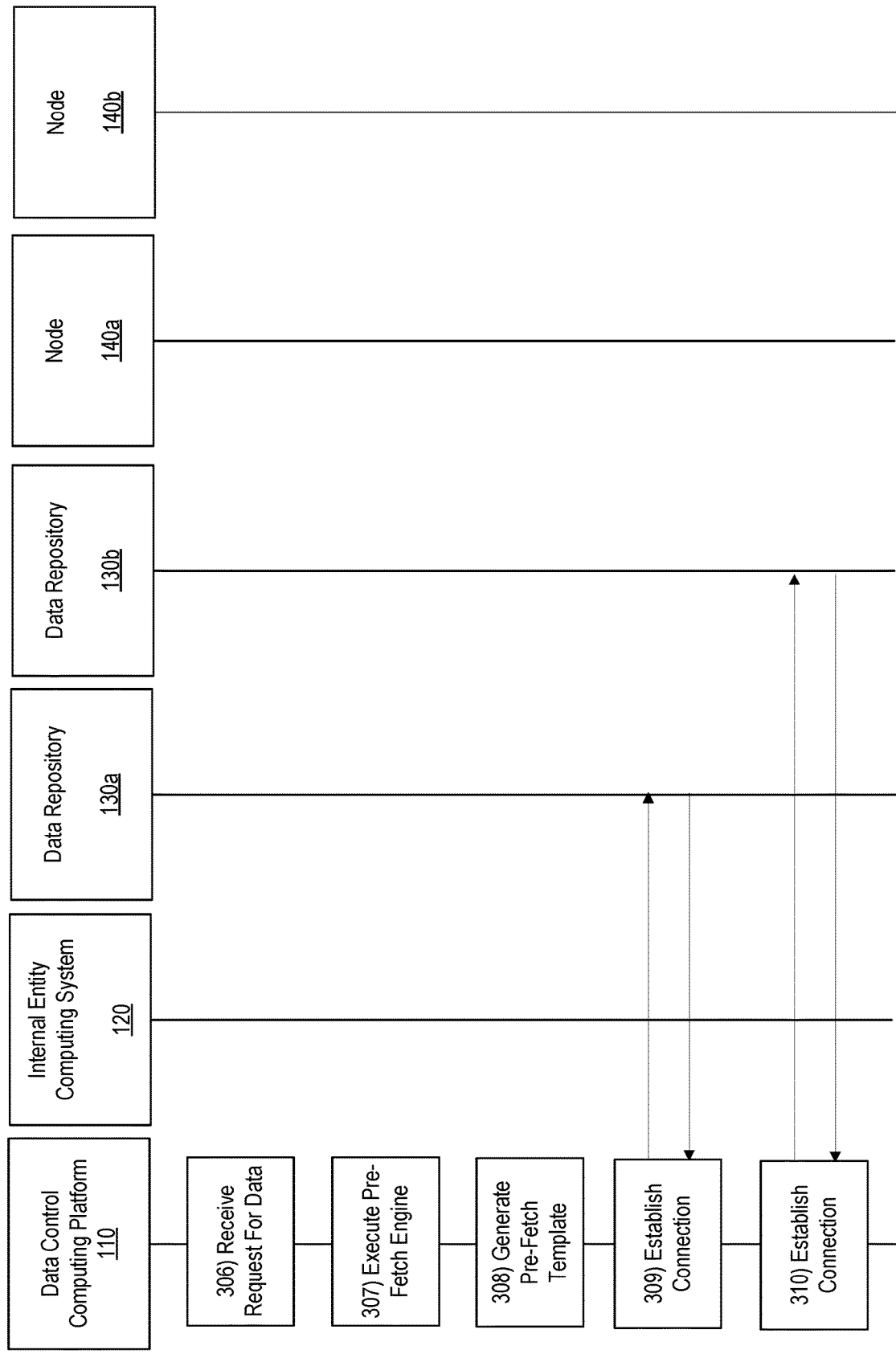

PRE-FETCH ENGINE WITH DATA EXPIRATION FUNCTIONALITY FOR MESH DATA NETWORK

BACKGROUND

Aspects of the disclosure relate to electrical computers, systems, and devices for controlling data transmission between data sources in various locations.

Data processing is an important business aspect of many enterprise organizations. Large enterprise organizations, particularly those that operate in various geographic locations or regions, often have data stored by data sources in the various geographic locations or regions. This data storage arrangement may cause inefficiencies in trying to retrieve data from the various sources for data processing. For instance, there may be latency in retrieving the data from the various data sources. In addition, the different geographic regions or locations each may have different regulatory requirements for data transmission. Further, while a data request may include a request for bulk data of a certain type, or the like, in some examples, the entirety of the bulk data might not be needed to perform the data processing operations for which it was requested. Accordingly, it would be advantageous to provide arrangements including a pre-fetch engine that intelligently evaluates data requests to identify responsive data sets and retrieves the data sets from data sources having a data controller that evaluates the data sets based on local regulations.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with controlling data transmission and latency when retrieving data from one or more sources in one or more locations.

In some aspects, a data request may be received by a computing platform. In some arrangements, a pre-fetch engine may be executed to analyze the data request and generate, using a machine learning model, a pre-fetch template identifying data sets responsive to the data request. The pre-fetch template may be transmitted to one or more data repositories via, for instance, a mesh data transmission network.

In response, a plurality of data sets may be received. In some examples, the data sets may include data use parameters for the respective data set. In some examples, the data use parameters may be based on a geographic location or region of the data repository from which the data sets are received.

The received plurality of data sets may be analyzed to determine whether a triggering action has occurred. For instance, the data sets may be analyzed to determine whether an expiration date has been reached or surpassed. If a triggering action has not occurred, the data may be processed. If a triggering action has occurred, one or more data modification functions may be performed. For instance, data may be deleted, prevented from further processing, or the like, in response to detection of a triggering action.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 3A-3E depict another illustrative event sequence for implementing data control functions in accordance with one or more aspects described herein;

DETAILED DESCRIPTION

Figure 1A:
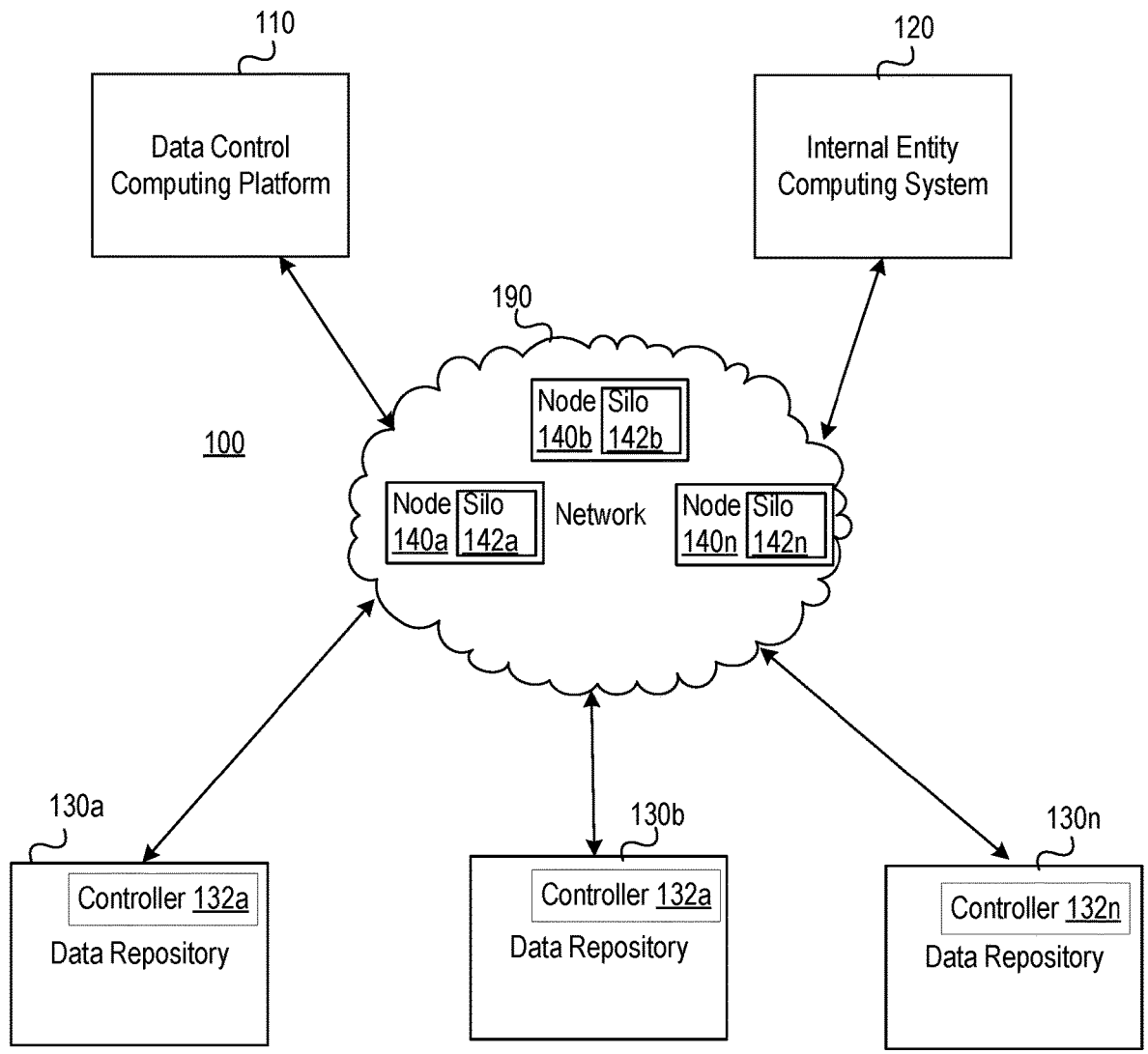
FIGS. 1A and 1B depict an illustrative computing environment for implementing data control functions in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, large enterprise organizations often use data processing functions during the course of business. However, when large enterprise organizations operate in various geographic locations or regions, data may be stored in those various regions, which can make retrieving data inefficient. In addition, ensuring compliance with local regulatory requirements for data transmission can be difficult when operating in multiple locations. Accordingly, aspects described herein are directed to a pre-fetch engine that intelligently identifies data sets responsive to a data request. The pre-fetch engine may generate a pre-fetch template that identifies the responsive data sets and may transmit the pre-fetch template, via a mesh data transmission network, to a plurality of data repositories. In some examples, the data repositories may be located in different geographic regions or locations.

In some examples, each data repository may include a data controller. The data controller at a respective data repository may analyze the pre-fetch template, identify response data sets stored by the respective data repository, and retrieve the response data sets. In some arrangements, the data controller may evaluate the response data sets to remove, redact, encrypt, or the like, data that is not eligible for transmission (e.g., based on local rules and regulations). In some examples, the data controller may flag or mark data with one or more data use parameters, such as a number of times the data may be processed, an expiration date of the data, or the like. In some examples, the data use parameters may include identification of a data modification action (e.g., delete data, encrypt data, prevent data from use, or the like) that may occur upon detection of a triggering action (e.g., data expiration).

In some arrangements, the data may be transmitted from the data repository to a computing platform via the mesh data transmission network. The mesh data transmission network may include a plurality of nodes and each node may have or include a data silo or micro silo. The data silos associated with each node may be used to manage the flow of data from the source to the destination, stage data for transmission via an alternate path through the mesh data transmission network, or the like.

In some examples, the arrangements described herein may include pre-fetching data from internal sources (e.g., trusted sources) and/or external sources (e.g., untrusted sources). In examples, in which data is received from external sources, in some examples, an edge-based data controller may validate received data and scan the data for viruses, malware, and the like. If any anomalies are detected, the data may be quarantined for further evaluation. In some examples, the edge-based data controller may validate data by cross linking data received from the external source with data from one or more internal or trusted sources.

These and various other arrangements will be discussed more fully below.

Figure 1B:
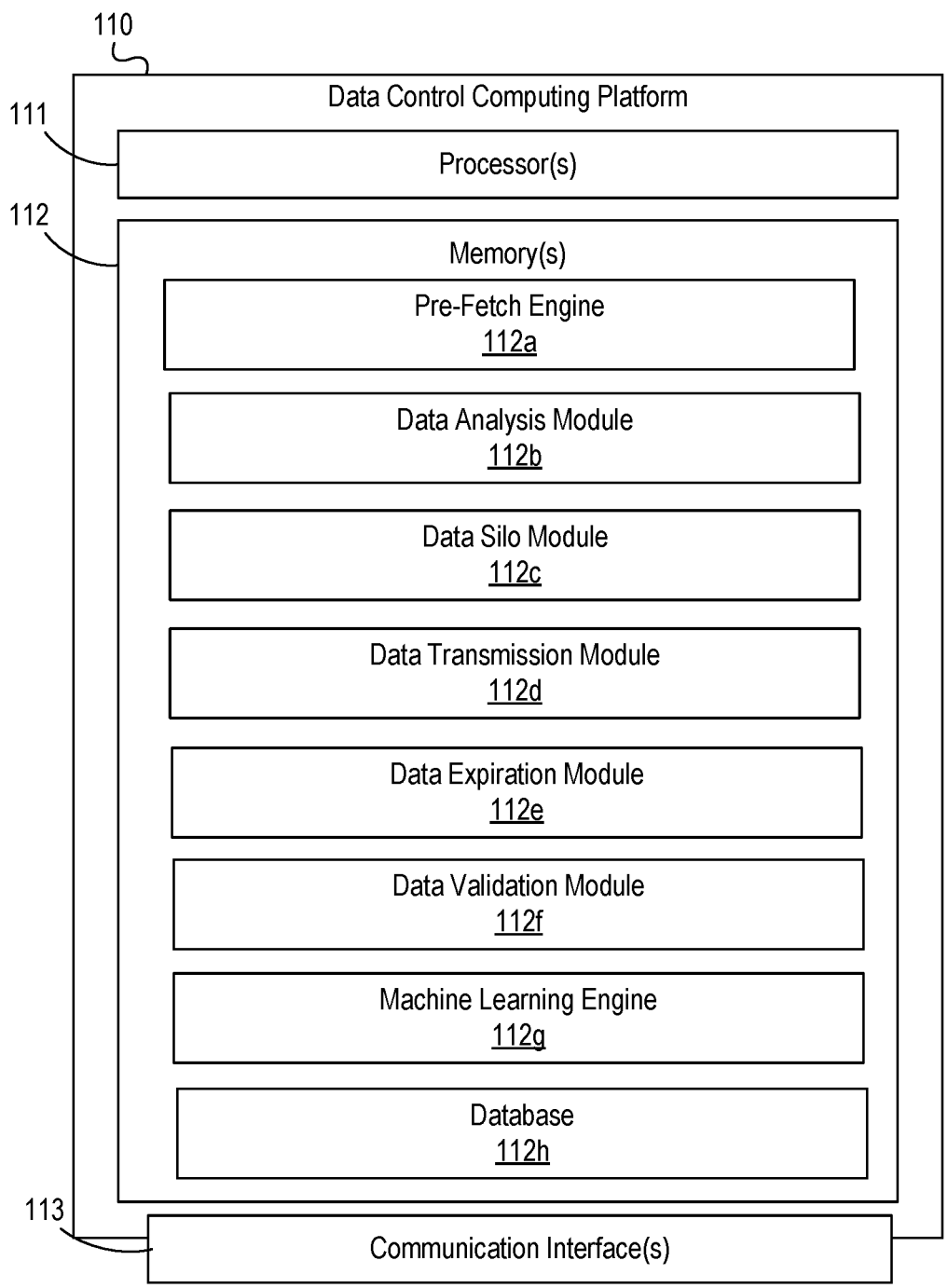

Aspects described herein may be implemented using one or more computing devices operating in a computing environment. For instance, FIGS. 1A-1B depict an illustrative computing environment for implementing a data control system including pre-fetch functions in accordance with one or more aspects described herein. Referring to FIG. 1A, computing environment 100 may include one or more computing devices and/or other computing systems. For example, computing environment 100 may include data control computing platform 110, internal entity computing system 120, and a plurality of data repositories 130a-130n, each of which may include a respective data controller 132a-132n. Although one internal entity computing system 120 and three data repositories with respective data controllers are shown, any number of systems or devices may be used without departing from the invention.

Data control computing platform 110 may be configured to perform intelligent, dynamic, and efficient data control functions including pre-fetch engine functions. For instance, when data is requested for analysis or processing, a request for data may be received by the data control computing platform 110. In some examples, a pre-fetch engine associated with the data control computing platform 110 may analyze the data request and generate a pre-fetch template indicating a plurality of data sets that may be pre-fetched (e.g., may be static data that may be transferred at any time, may be data unlikely to change in a predetermined time period, may be data that is a portion of the desired data being requested, may be data stored at a plurality of different data repositories, or the like). In some examples, the pre-fetch template may be generated using a machine learning model trained using historical data retrieval data. In some examples, the pre-fetch template may include a mapping of particular data sets to particular data repositories and/or particular data analysis functions.

In some examples, the data control computing platform 110 may transmit the pre-fetch template to one or more data repositories, such as data repositories 130a-130n. In some examples, each data repository 130a-130n may be associated with a different geographic region or area. Accordingly, while data may be stored in various locations around the world, the data control computing platform 110 may retrieve data from the plurality of data repositories for centralized analysis.

In some arrangements, the one or more data repositories 130a-130n may receive the pre-fetch template and may retrieve one or more data sets corresponding to data requested via the pre-fetch template. Upon identifying and retrieving the one or more data sets, a respective data controller 132a-132n may analyze the retrieved data to evaluate the data for compliance with local, regional, or the like, regulations. For instance, each data controller 132a-132n may be an intelligent data controller including data transmission rules associated with transmitting data of various types within the local geographic region or area and/or between geographic regions or areas. Accordingly, as data is retrieved prior to transmission, each respective data controller 132a-132n may evaluate the data to identify any data that may be restricted from transmission and remove, redact, encrypt, or the like, that data or those data sets, may identify any data that is time limited (e.g., must be held until a particular time or date before being transmitted), may identify data having an expiration data or a date after which it can no longer be considered accurate and should not be processed, or the like. In some examples, the data controller 132a-132n may remove data that is restricted from transmission or is identified as time limited, may apply an expiration parameter to data having an expiration or date after which it should no longer be processed, and the like. In some examples, these parameters may be transmitted to the data control computing platform 110 with the data and may cause the data to be automatically deleted when the date of expiration is reached, may cause a notification to be transmitted to an administrator when the date of expiration is reached, or the like.

In some examples, data control computing platform 110 may receive the data sets from the one or more data repositories 130a-130n and may determine whether the source of the data (e.g., the data repository) is an internal source (e.g., within or associated with an enterprise organization implementing the data control computing platform 110) or an external source (e.g., outside of the enterprise organization). If an external source, in some examples, the data may be held and validated to determine whether malware or other anomalies exist in the data. If so, the data may be quarantined.

The received and/or validated data may then be processed by the data control computing platform 110. In some examples, if data gaps exist in the data sets (e.g., because a respective data controller 132a-132n) removed data that was not available for transfer, in some examples, data control computing platform 110 may ignore that data set (e.g., process the remaining data) or may insert a simulated or substitute value in place of the missing data or data set.

In some examples, the data control computing platform 110 may monitor the network through which the data is being transmitted to determine a most efficient transmission route. detect issues in transmission of data sets, or the like. For instance, the data may be transmitted via a mesh data transmission network 190 having a plurality of nodes 140a-140n. In some examples, each node 140a-140n may include a data silo 142a-142n that may be used to stage or hold data if, for instance, an issue is detected with a transmission path, if a data transmission rate must be controller based on processing speeds of the source and destination, or the like. Accordingly, as the data control computing platform 110 monitors the data transmission within the mesh network 190, the data control computing platform 110 may, in some examples, instruct a node, such as node 140*a*, to hold data in a data silo 142*a* until another transmission path is identified. In some examples, identifying another transmission path may include evaluating a status of each node, evaluating bandwidth, and the like. In some arrangements, the data control computing platform 110 may identify an alternate path and may transmit an instruction to node 140*a* to transfer the data in the data silo 142*a* to a node along the alternate path (e.g., node 140*b*). The instruction may be transmitted to node 140*a* and executed, thereby causing the data in the data silo 142*a* to be transmitted, via the mesh network 190, to the identified node 140*b*. Node 140*b* may then hold the data in a data silo 142*b*, transmit the data to the data control computing platform 110 for processing, or transmit the data to another node along the transmission path to the data control computing platform 110.

Internal entity computing system 120 may be or include or more computing devices (e.g., servers, server blades, or the like) and/or one or more computing components (e.g., memory, processor, and the like) and may be configured to receive, from one or more user devices, such as laptops, desktops, mobile devices, and the like, requests for data. For instance, internal entity computing system 120 may host and/or include one or more systems, applications, and the like, for storing data, analyzing data, and the like, that may be accessed by one or more users associated with the enterprise organization during the course of business (e.g., via a user computing device). Accordingly, requests for data that may be used in various data analysis processes may be received by the internal entity computing system 120.

Computing environment 100 may further include a plurality of data repositories 130*a*-130*n*. In some examples, each data repository may include a respective data controller 132*a*-132*n*. In some examples, the data repositories 130*a*-130*n* may be distributed in different geographic locations or regions. For instance, the data repositories 130*a*-130*n* may be distributed in various geographic locations or regions in which the enterprise organization operates, has offices, or the like. Accordingly, as data is generated during the course of business for the enterprise organization, it may be stored in a respective data repository 130*a*-130*n* in that region or location.

Data repositories 130*a*-130*n* may be internal data repositories (e.g., associated with or internal to the enterprise organization and storing data associated with the enterprise organization, customers of the enterprise organization, and the like) or external data repositories (e.g., outside of the enterprise organization and storing publicly available or other data used in the course of business by the enterprise organization). In some examples, data may be requested via application programming interfaces (APIs), from social media platforms, or the like.

In some examples, each data controller 132*a*-132*n* may be an intelligent data controller and store rules that may be control transmission of data or retrieval of data from the respective data repository 130*a*-130*n*. In some arrangements, the rules may be particular to the geographic region or location (e.g., may include regulatory rules particular to data storage, transmission, or the like, for that particular location or region). For instance, rules directed to particular types of data that may be transmitted outside of the local region or location, rules directed to an expiration date of various data elements or types, and the like, may be stored by the respective data controller 132*a*-132*n* and applied to data retrieved from a respective data repository 130*a*-130*n* in response to receiving the pre-fetch template.

In some examples, a respective data controller 132*a*-132*n* associated with a data repository 130*a*-130*n* may analyze a pre-fetch template received from the data control computing platform 110, identify data sets that correspond to data sets in the pre-fetch template and may evaluate the data sets to determine whether they meet local regulations or requirements for data transmission. In some examples, that may include holding data until a time requirement is met (e.g., if local regulatory requirements prevent transmission of a data element or data set until a predetermined time or date), encrypting data before transmission to ensure that data is not accessed until a predetermined time, or the like. In some examples, a data controller 132*a*-132*n* may hide or encrypt data so that it cannot be accessed or immediately accessed (e.g., data may be transmitted to the destination but might not be accessible until one or more conditions are met). In some examples, each data controller 132*a*-132*n* may intelligently modify transmission of data (e.g., manage data sizing, or the like) to ensure efficient data transmission and processing.

Although three data repositories 130*a*-130*n* and three corresponding data controllers 132*a*-132*n* are shown in FIG. 1A, more or fewer data repositories and corresponding data controllers may be used without departing from the invention.

As mentioned above, computing environment 100 also may include one or more networks, which may interconnect one or more of data control computing platform 110, internal entity computing system 120, and data repositories 130*a*-130*n*. For example, computing environment 100 may include network 190. In some examples, network 190 may include a private network associated with the enterprise organization. Network 190 may include one or more sub-networks (e.g., Local Area Networks (LANs), Wide Area Networks (WANs), or the like). Network 190 may be associated with a particular organization (e.g., a corporation, financial institution, educational institution, governmental institution, or the like) and may interconnect one or more computing devices associated with the organization. For example, data control computing platform 110, internal entity computing system 120, and/or data repositories 130*a*-130*n* may be associated with an enterprise organization (e.g., a financial institution), and network 190 may be associated with and/or operated by the organization, and may include one or more networks (e.g., LANs, WANs, virtual private networks (VPNs), or the like) that interconnect data control computing platform 110, internal entity computing system 120, data repositories 130*a*-130*n* and one or more other computing devices and/or computer systems that are used by, operated by, and/or otherwise associated with the organization.

In some examples, network 190 may be a mesh data transmission network 190 including a plurality of nodes 140*a*-140*n* that create multiple transmission paths from a source (e.g., data repository 130*a*-130*n*) to a destination (e.g., data control computing platform 110). Although three nodes 140*a*-140*n* are shown, more of fewer nodes may be used without departing from the invention. In some examples, each node 140*a*-140*n* of the mesh network 190 may be arranged along a transmission path for data being received by the data control computing platform 110 from one or more data repositories 130*a*-130*n*. In some examples, data may be transmitted by and/or to a plurality of nodes 140*a*-140*n* between the originating data repository 130*a*-130*n* and the data control computing platform 110.

In some examples, one or more nodes of the plurality of nodes 140a-140n may include a data silo 142a-142n that may, in some examples, be used to hold or stage data while data control computing platform 110 evaluates a transmission path, node availability, or the like. Accordingly, in some examples, data may be held in a data silo 142a at a first node 140a while data control computing platform 110 evaluates other nodes 140b-140n to identify a new transmission path, a node status, a next node, or the like.

Referring to FIG. 1B, data control computing platform 110 may include one or more processors 111, memory 112, and communication interface 113. A data bus may interconnect processor(s) 111, memory 112, and communication interface 113. Communication interface 113 may be a network interface configured to support communication between data control computing platform 110 and one or more networks (e.g., network 190, network 195, or the like). Memory 112 may include one or more program modules having instructions that when executed by processor(s) 111 cause data control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of data control computing platform 110 and/or by different computing devices that may form and/or otherwise make up data control computing platform 110.

For example, memory 112 may have, store and/or include pre-fetch engine 112a. Pre-fetch engine 112a may store instructions and/or data that may cause or enable the data control computing platform 110 to intelligently generate a pre-fetch template in response to receiving a request for data. For instance, pre-fetch engine 112a may generate a pre-fetch template including data sets that may be responsive to the request for data. The pre-fetch engine 112a may execute a machine learning model (which may, e.g., be hosted by machine learning engine 112g) to identify data sets to be retrieved from various data repositories 130a-130n in response to the request for data. Pre-fetch engine 112a may transmit the pre-fetch template to one or more data repositories 130a-130n for fulfillment.

In some examples, the pre-fetch engine 112a may execute the machine learning model using parameters of the data request as inputs. The pre-fetch engine 112a may identify responsive data sets that may, in some examples, be less than the entirety of a bulk data set. For instance, if a user has requested data related to payment processing, the pre-fetch engine 112a, by executing the machine learning model, may identify particular payment processing data sets, or an amount of data, that may be operated on or processed to provide the necessary data to the requesting user but do not include the entirety of the payment processing data (e.g., from one or more data repositories 130a-130n in one or more geographic regions). Accordingly, the pre-fetch engine 112a may intelligently identify data sets responsive to the data request and transmit requests for those data sets via the pre-fetch template.

In some examples, a pre-fetch engine 112a may generate a first pre-fetch template that may be transmitted to one or more data repositories. Data may be received in response to the pre-fetch template and, during processing, user input may be received requesting additional or alternate data. Accordingly, the pre-fetch engine 112a may generate a second pre-fetch template to accommodate the additional request.

Additionally or alternatively, as data is processed, pre-fetch engine 112a may detect discrepancies in data, changes in patterns of data, or the like and, based on the discrepancies or changes, automatically generate a second pre-fetch template to accommodate the discrepancies or changes. In some examples, the machine learning model may be executed using aspects of the discrepancies or changes in patterns as inputs to generate the second pre-fetch template.

Accordingly, the pre-fetch engine 112a, in conjunction with one or more data controllers 132a-132n at one or more data repositories 130a-130n in one or more geographic locations or regions, may efficiently identify data sets responsive to a data request and receive data in accordance with local regulatory requirements. By intelligently pre-fetching data, latency issues associated with data retrieval from multiple repositories 130a-130n in multiple locations or regions may be managed.

Data control computing platform 110 may further have, store and/or include data analysis module 112b. Data analysis module 112b may store instructions and/or data that may cause or enable data control computing platform 110 to analyze data received from one or more data repositories 130a-130n (e.g., in a response to a pre-fetch template) and determine whether data elements and/or data sets are missing (e.g., a data controller 132a-132n has not transmitted data elements or sets, has blocked data elements or sets, has encrypted data elements or sets, or the like in generating response data sets). If data elements and/or data sets are missing, data analysis module 112b may generate an instruction to ignore the missing data sets during processing (e.g., continue computations as if the data were never there), may generate and insert simulated or substitute values for the missing data elements or data sets, or the like.

Data control computing platform 110 may further have, store and/or include data silo module 112c. Data silo module 112c may store instructions and/or data that may cause or enable data control computing platform 110 to generate one or more data silos or micro silos 142a-142n at one or more nodes 140a-140n within the mesh network. The data silos 142a-142n may be used to hold or stage data being transmitted from one or more data repositories 130a-130n to the data control computing platform 110.

In some examples, data silos 142a-412n may be used to control the flow of data within the mesh data transmission network 190. For instance, if data is being transferred from a system with a first processing speed to a system with a second, slower processing speed, the data silos 142aa-142n may be used to hold data within the mesh network 190 to control data flow to the destination system. Accordingly, one or more data sets may be stored, staged or held at one or more data silos 142a-142n within the mesh network until a triggering event occurs, a time has lapsed, or the like.

Further, data silos 142a-142n may be used to hold data when an issue is detected within a transmission path of the mesh data transmission network 190. For instance, data sets may be held in one or more data silos 142a-142n and transitioned to a different transmission path within the mesh network 190 to ensure efficient transmission. Since all nodes 140a-140n within the mesh network are connected, data may be held at a data silo 142a-142n at any node 140a-140n and redirected to a different transmission path (e.g., sent to a different second node than in an original or expected transmission path).

Data control computing platform 110 may further have, store and/or include data transmission module 112d. Data transmission module 112d may store instructions and/or data that may cause or enable the data control computing platform 110 to evaluate a status of nodes 140*a*-140*n* within the mesh network 190, evaluate bandwidth or transmission rates, and the like, to determine whether to silo data at particular node 140*a*-140*n*, whether to modify a transmission path through the mesh network 190, or the like.

Data control computing platform 110 may further have, store and/or include data expiration module 112*e*. Data expiration module 112*e* may store instructions and/or data that may cause or enable the data control computing platform 110 to evaluate received data that may include a parameter indicating an expiration date for data, a date after which the data should not be used in processing and should be re-fetched, and the like, to determine whether a date parameter has been reached. If so, data expiration module 112*e* may delete data, flag or label the data that should not be used in processing, and the like.

Data control computing platform 110 may further have, store and/or include data validation module 112*f*. Data validation module 112*f* may store instructions and/or data that may cause or enable the data control computing platform 110 to evaluate data received from one or more data repositories 130*a*-130*n*, determine a source of the data, determine whether a source is internal or external to the enterprise organization, and, if external, execute additional validation functions. For instance, the received data may be scanned for malware and, if anomalies are detected, the data may be quarantined, further processed, or the like.

In some examples, data validation module 112*f* may work in conjunction with an edge-based data controller that evaluates data from external sources. The edge-based data controller may, in some examples, scan the received data for malware, hold the data if further processing or evaluation is required, cross link data with data from other sources to validate the data, and the like. Accordingly, an external source may set up a proxy to provide access to the data but the data may pass through the edge-based data controller for evaluation prior to reaching the destination.

Data control computing platform 110 may further have, store and/or include machine learning engine 112*g*. Machine learning engine 112*g* may store instructions and/or data that may cause or enable the data control computing platform 110 to train, execute, validate and/or update one or more machine learning models that may be used (e.g., by pre-fetch engine 112*a*) to identify data for pre-fetch, generate pre-fetch templates, evaluate data transmission paths, and the like. In some examples, the machine learning model may be trained (e.g., using historical data related to data received responsive to data requests, using historical data transmission parameters to determine data transmission outcomes, and the like, to identify patterns or sequences in data that indicate data sets that may be responsive to a data request, when data should be siloed or staged, when a transmission path should be modified, or the like. The machine learning model may, in some arrangements, use as inputs a request for data and, based on execution of the model, output particular data sets that should be pre-fetched or requested via pre-fetch template. Additionally or alternatively, the machine learning model may use as inputs current network conditions or parameters, node status of one or more nodes 140*a*-140*n* in the mesh network, or the like and, based on execution of the model, output a data transmission path or modification may be identified, a decision to hold or stage data at one or more nodes 140*a*-140*n* may be identified or the like. In some examples, the machine learning model may be or include one or more supervised learning models (e.g., decision trees, bagging, boosting, random forest, neural networks, linear regression, artificial neural networks, logical regression, support vector machines, and/or other models), unsupervised learning models (e.g., clustering, anomaly detection, artificial neural networks, and/or other models), knowledge graphs, simulated annealing algorithms, hybrid quantum computing models, and/or other models.

Data control computing platform 110 may further have, store and/or include a database 112*h*. Database 112*h* may store historical data used to train the machine learning model, received data or data sets, data validation outcomes, and the like.

FIGS. 2A-2F depict one example illustrative event sequence for implementing data control functions in accordance with one or more aspects described herein. The events shown in the illustrative event sequence are merely one example sequence and additional events may be added, or events may be omitted, without departing from the invention. Further, one or more processes discussed with respect to FIGS. 2A-2F may be performed in real-time or near real-time.

Figure 2A:
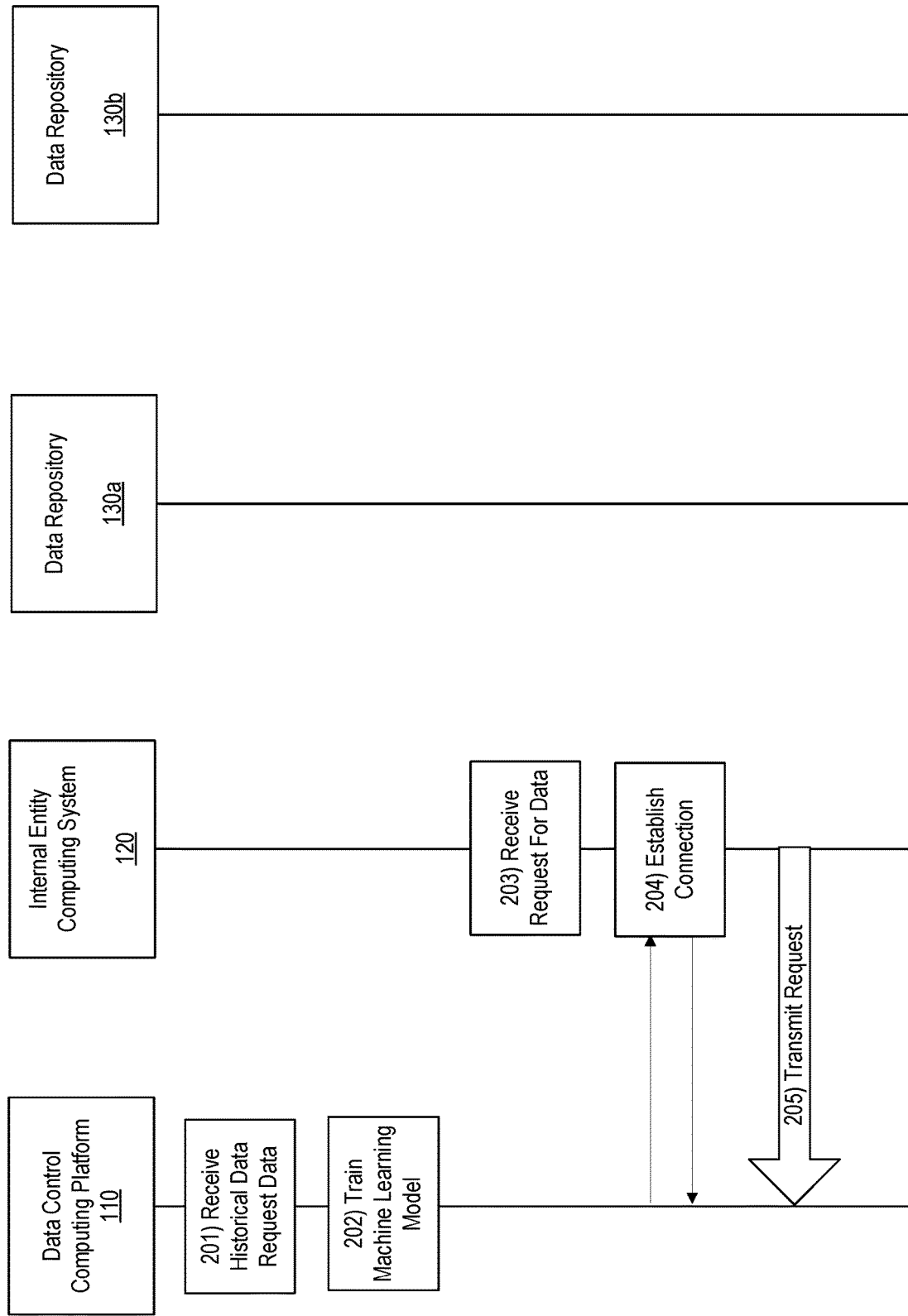
FIGS. 2A-2F depict an illustrative event sequence for implementing data control functions in accordance with one or more aspects described herein.

With reference to FIG. 2A, at step 201, data control computing platform 110 may receive historical data request data. For instance, data control computing platform 110 may receive historical data associated with one or more data requests, data sets provided in response to the data request, types of data received, types of data not received, and the like.

At step 202, data control computing platform 110 may train a machine learning model. For instance, data control computing platform 110 may train a machine learning model using the received historical data. In some examples, labeled data indicating data sets received responsive to particular data requests, data types, and the like may be used to train the machine learning model.

At step 203, an internal entity computing system 120 of the enterprise organization may receive a request for data. For instance, internal entity computing system 120 which may execute or host one or more systems used in the course of business for the enterprise organization, may receive a request for data from a user (e.g., an employee of the enterprise organization). In some examples, the request for data may include requested types of data, date ranges, time ranges, categories of data, line of business associated with the data, and/or other parameters.

At step 204, internal entity computing system 120 may connect to data control computing platform 110. For instance, a first wireless connection may be established between internal entity computing system 120 and data control computing platform 110. Upon establishing the first wireless connection, a communication session may be initiated between internal entity computing system 120 and data control computing platform 110.

At step 205, internal entity computing system 120 may transmit the received request for data to the data control computing platform 110. For instance, internal entity computing system 120 may transmit the request for data during the communication session initiated upon establishing the first wireless connection.

Figure 2B:
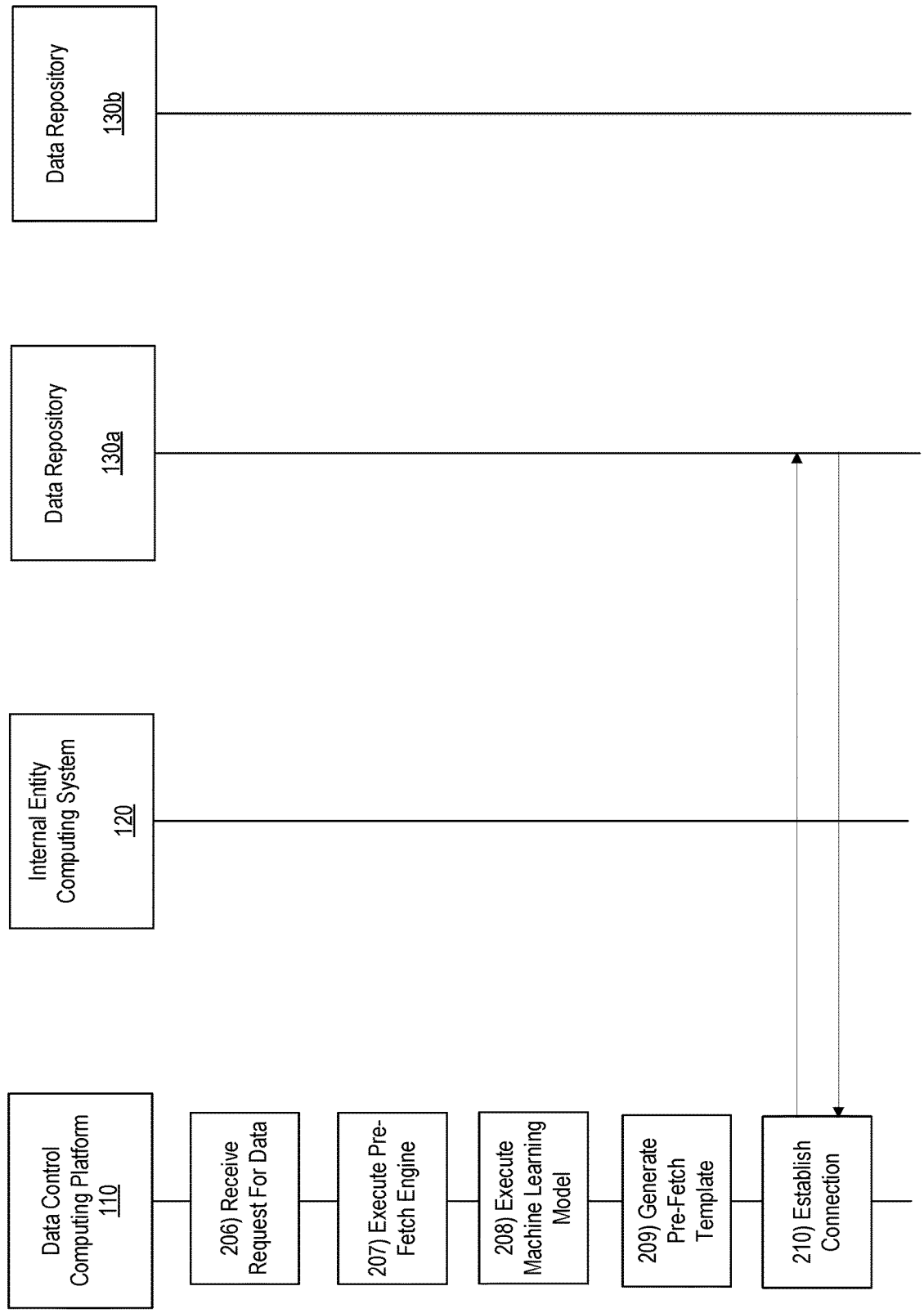

With reference to FIG. 2B, at step 206, data control computing platform 110 may receive the request for data sent by the internal entity computing system 120.

At step 207, data control computing platform 110 may execute a pre-fetch engine. For instance, data control computing platform 110 may execute a pre-fetch engine which may cause parameters of the request for data (e.g., data types, date ranges, and the like) to be input into the machine learning model. The pre-fetch engine may work in conjunction with the machine learning model to generate a pre-fetch template identifying data sets, data elements, and the like, that may be pre-fetched to reduce computing resources in retrieving the requested data. In some examples, the pre-fetch engine may identify one or more data repositories from which the data should be retrieved.

At step 208, the machine learning model may be executed (e.g., using the parameters of the request for data as inputs) and, in some examples, a pre-fetch template may be output at step 209. For instance, the pre-fetch template may identify data sets, data elements, or the like, responsive to the request for data.

At step 210, data control computing platform 110 may connect to data repository 130a. For instance, a second wireless connection may be established between data control computing platform 110 and data repository 130a. Upon establishing the second wireless connection, a communication session may be initiated between data control computing platform 110 and data repository 130a.

Figure 2C:
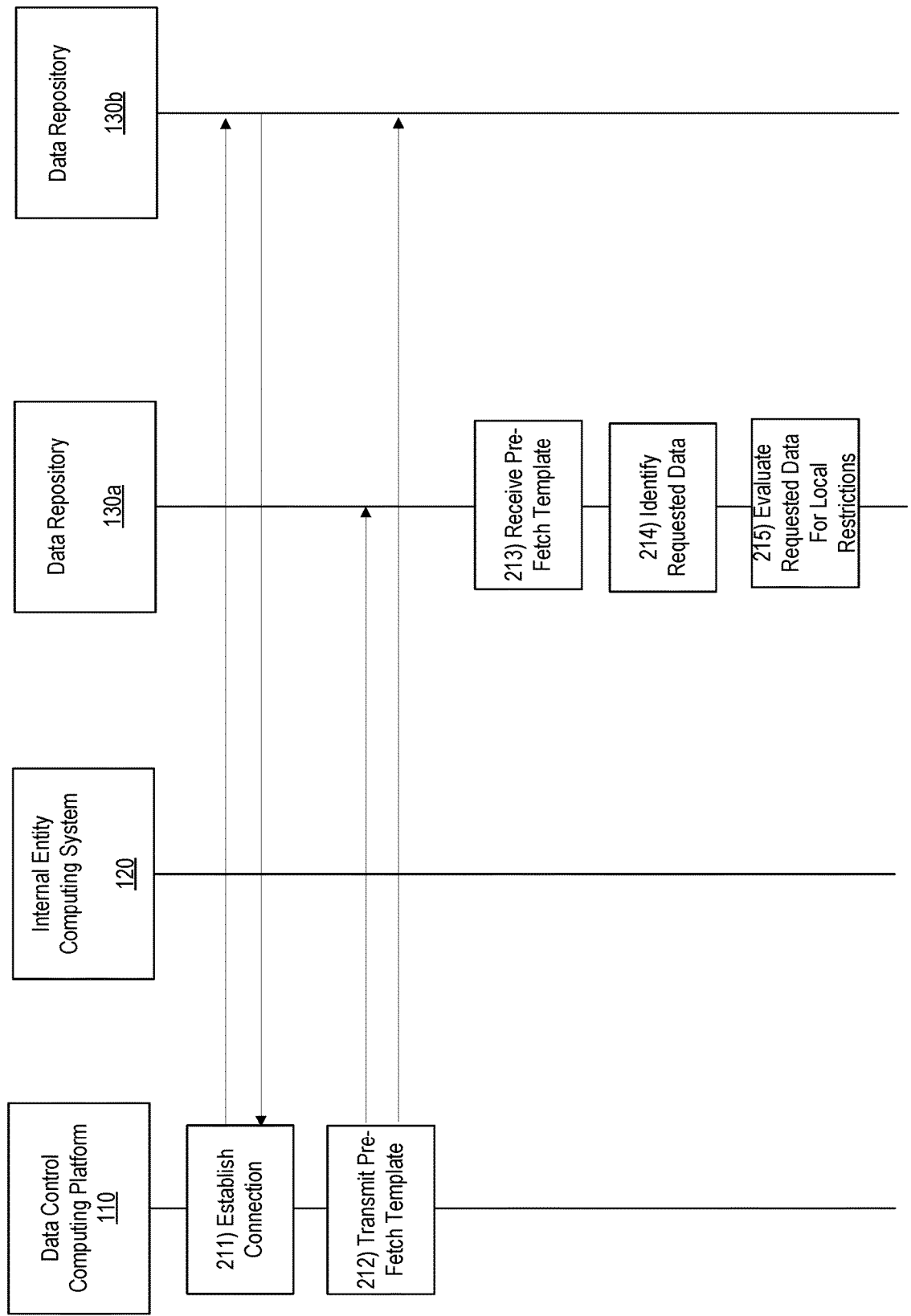

With reference to FIG. 2C, at step 211, data control computing platform 110 may connect to data repository 130b. For instance, a third wireless connection may be established between data control computing platform 110 and data repository 130b. Upon establishing the third wireless connection, a communication session may be initiated between data control computing platform 110 and data repository 130b.

Although connections to two data repositories are shown, more or fewer connections to more or fewer data repositories may be established without departing from the invention.

At step 212, the data control computing platform 110 may transmit or send the generated pre-fetch template to the data repositories 130a, 130b. For instance, the data control computing platform 110 may transmit or send the pre-fetch template to data repository 130a during the communication session initiated upon establishing the second wireless connection and to data repository 130b during the communication session initiated upon establishing the third wireless connection.

At step 213, data repository 130a may receive the pre-fetch template and may execute one or more instructions or commands in response to receiving the pre-fetch template.

For instance, at step 214, data repository 130a (e.g., via data controller 132a) may identify one or more data sets, data elements, or the like, identified in the pre-fetch template that may be responsive to the data request.

At step 215, the data controller 132a associated with data repository 130a may evaluate the identified data based on one or more rules, regulations, or the like, that may control data transmission, data use, and the like. As discussed, the data controller 132a may store rules, regulations, and the like, particular to a geographic location or region associated with the data repository (e.g., the physical location of the data repository 130a). Accordingly, local rules and regulations may be applied to the identified data to determine whether any data transmission restrictions are required, whether an expiration date of any data sets or data elements should be set, or the like.

Figure 2D:
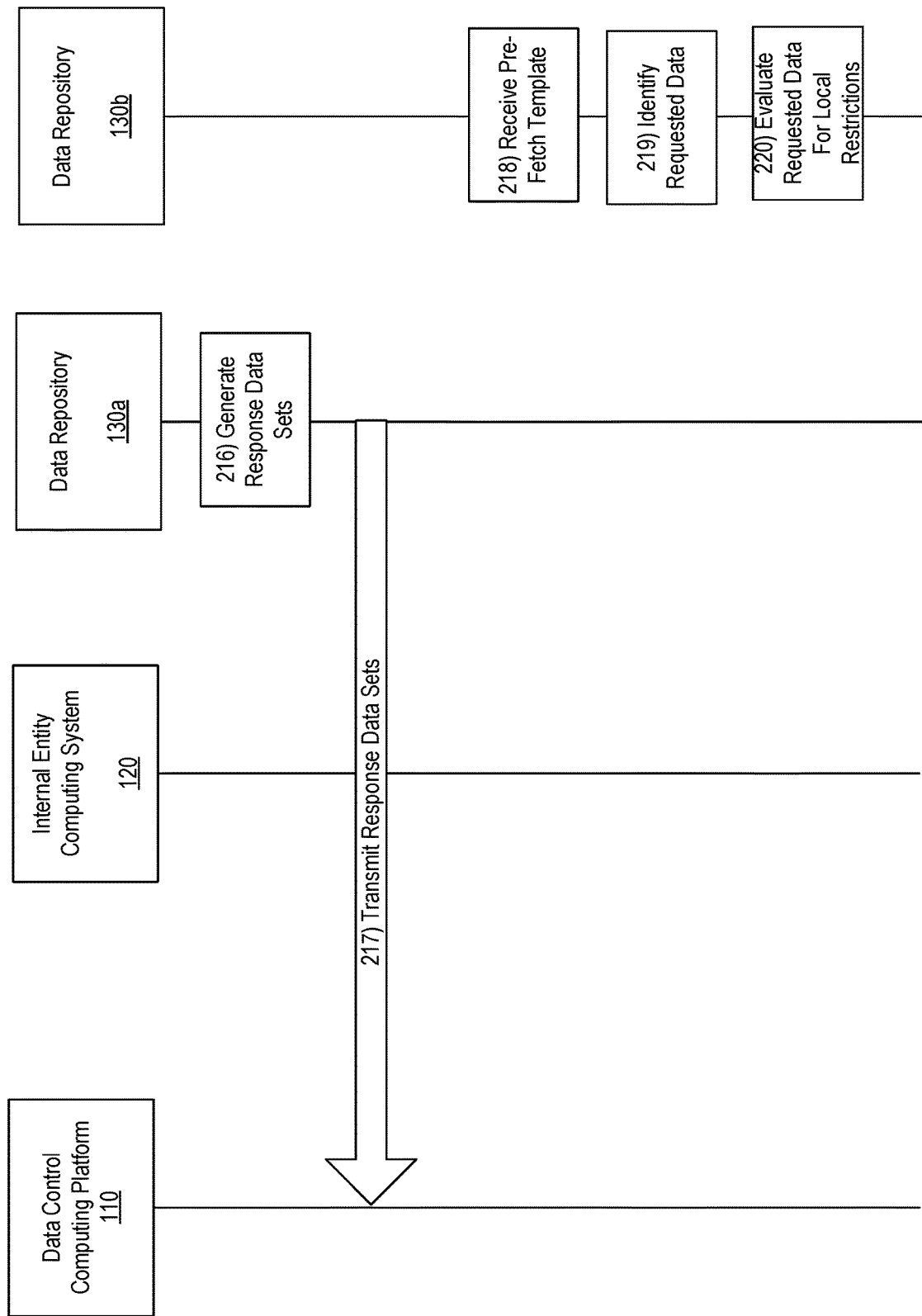

With reference to FIG. 2D, at step 216, data repository 130a (e.g., via data controller 132a) may generate one or more response data sets. In some examples, the response data sets may include data that meets regulatory or local rules or criteria for transmission from the location of the data repository 130a (e.g., local rules of the geographic location or region of the data repository 130a) the destination (e.g., based on the evaluation performed at step 215). Accordingly, in some examples, all responsive data might not be used to generate the response data sets and, instead, only data meeting rules or requirements (e.g., a subset or less than all of the responsive data) to be transmitted may be used to generate the response data sets (e.g., while data that does not comply is removed, redacted, encrypted to prevent access, or the like). In some examples, the data controller 132a may mark or flag data within the response data sets with an expiration date or time. date or time after which the data should not be used in processing, number of times the data may be processed, or the like. This mark or flag may be transmitted with the data. In some examples, the respective data controller 132a-132n may encrypt the data, block the data from use after a particular time, or the like. These and various other data use parameters may then be evaluated by the data control computing platform 110.

At step 217, the data repository 130a may transmit or send (e.g., via the mesh network 190) the generated response data sets to the data control computing platform 110.

At step 218, data repository 130b may receive the pre-fetch template and may execute one or more instructions or commands in response to receiving the pre-fetch template.

For instance, at step 219, data repository 130b (e.g., via data controller 132b) may identify one or more data sets, data elements, or the like, identified in the pre-fetch template that may be responsive to the data request.

At step 220, the data controller 132b associated with data repository 130b may evaluate the identified data based on one or more rules, regulations, or the like, that may control data transmission, data use, and the like. As discussed, the data controller 132b may store rules, regulations, and the like, particular to a geographic location or region associated with the data repository 130b (e.g., the physical location of the respective data repository). Accordingly, local rules and regulations may be applied to the identified data to determine whether any data transmission restrictions are required, whether an expiration date of any data sets or data elements should be set, or the like.

Figure 2E:
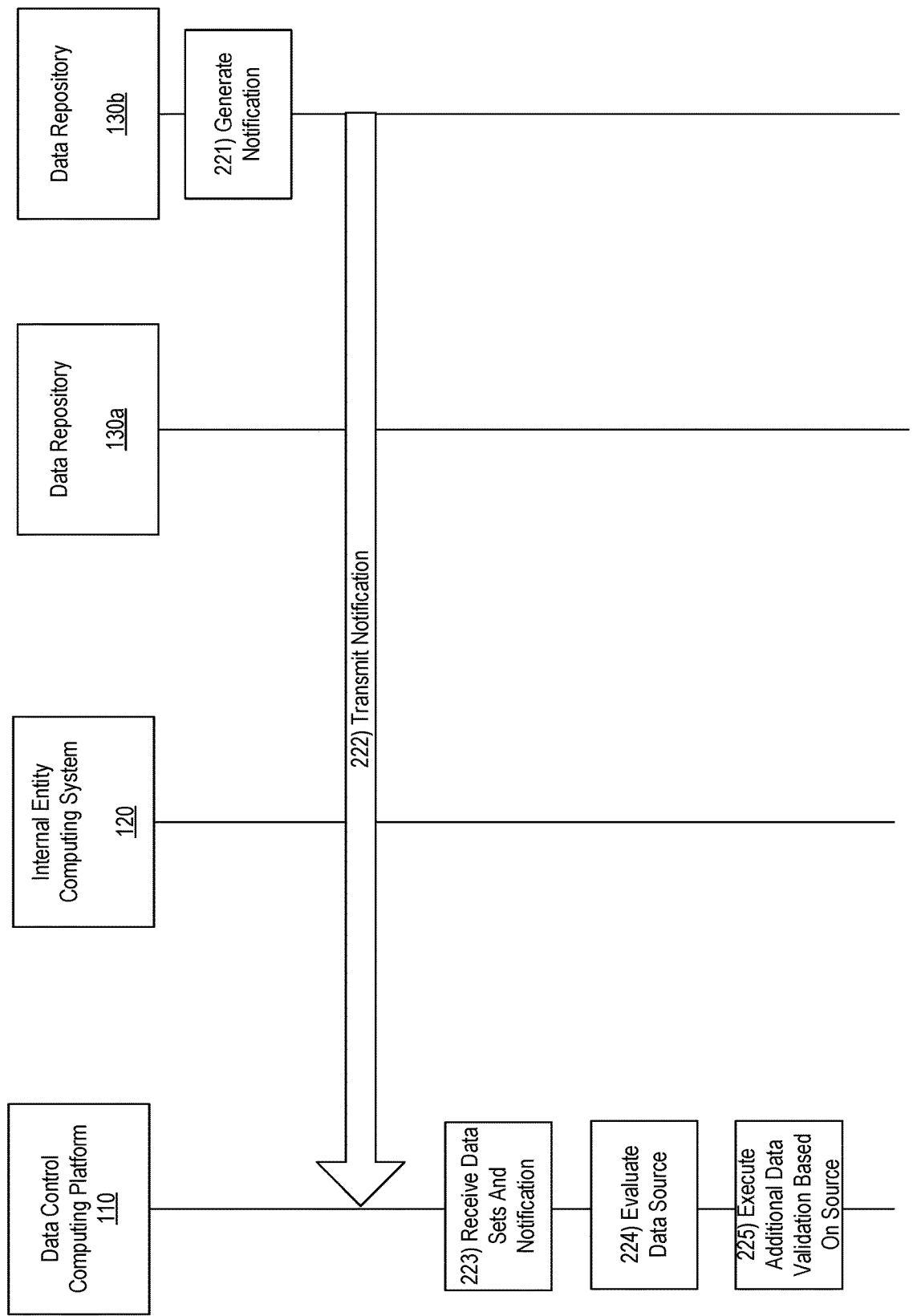

With reference to FIG. 2E, at step 221, data repository 130b may generate a notification indicating that responsive data is not available for transmission at that time. Accordingly, data repository 130b may hold the responsive data and may generate and transmit response data sets (e.g., data sets or data elements that are responsive to the request and meet the local requirements for transmission based on evaluation by data controller 132b) when the data is available or eligible for transmission.

At step 222, data repository 130b may transmit or send the generated notification to the data control computing platform 110.

At step 223, data control computing platform 110 may receive the response data sets from data repository 130a and the notification from data repository 130b.

At step 224, data control computing platform 110 may evaluate the source of data and/or notifications received. For instance, data control computing platform 110 may evaluate data repository 130a and/or data repository 130b to determine whether each data repository 130a, 130b is an internal data repository or an external data repository. If an internal data repository, the process may continue at step 227 in FIG. 2F. If a data repository is an external data repository, the process may continue at step 225.

At step 225, data control computing platform 110 may execute one or more additional data validation processes. For instance, data received from an external data repository may be scanned for malware or other malicious activity by, for instance, an edge-based data controller on the mesh data transmission network. In some examples, the data validation may include cross-linking or cross-checking data from external sources to data from trusted sources (e.g., internal sources). For instance, if data is received from a social media platform, the data may be validated by cross linking the data with other data from trusted sources. In some examples, the pre-fetch engine may be used to identify additional data that should be used for cross linking or validating the external data and may generate a pre-fetch template to retrieve that data.

Figure 2F:
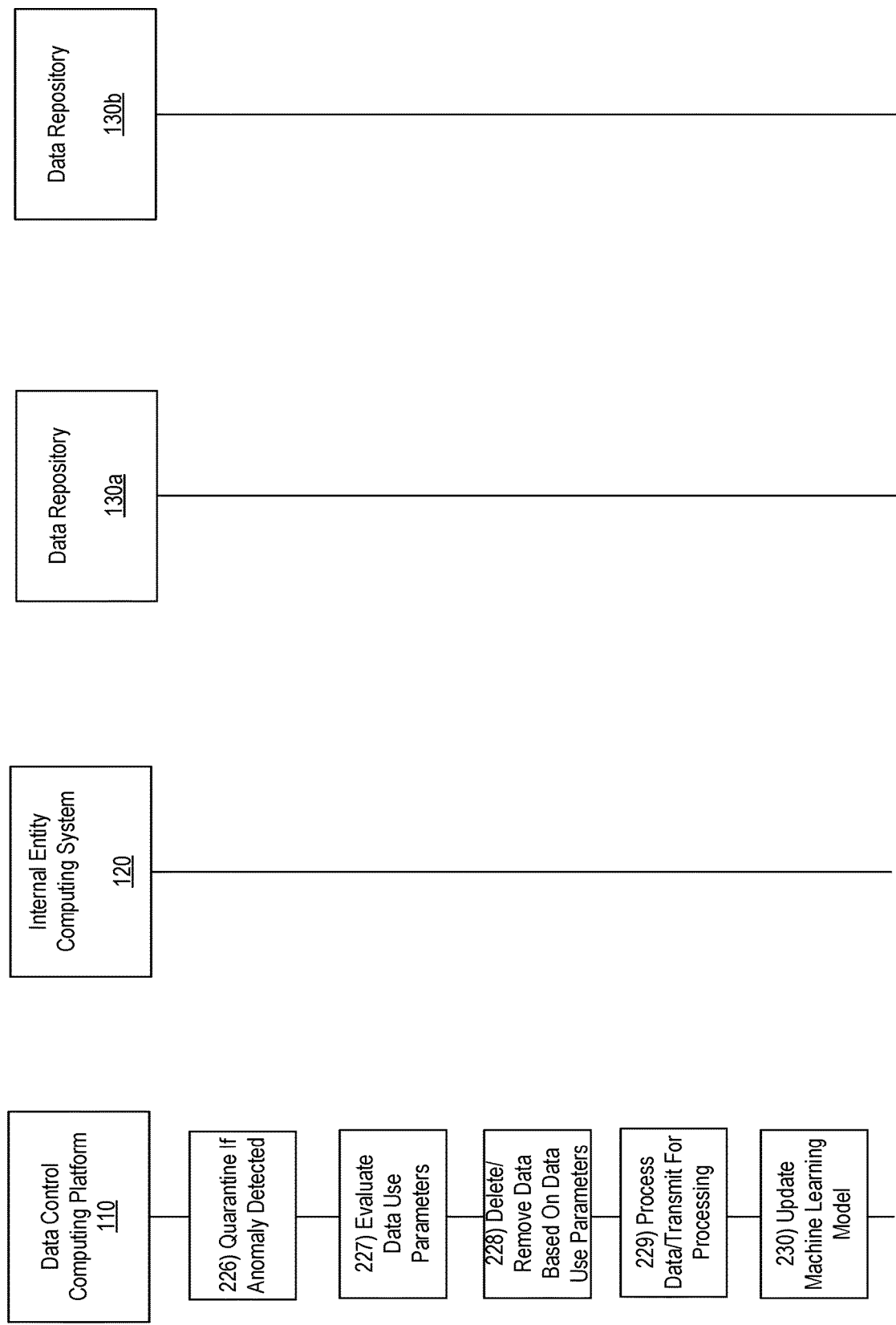

With reference to FIG. 2F, at step 226, if an anomaly is detected at step 225, the received data may be quarantined and further evaluated for malicious content. If no anomalies are detected the process may continue at step 227.

At step 227, data control computing platform 110 may evaluate any data use parameters received with the received response data sets. For instance, data control computing platform 110 may evaluate any data use parameters, such as expiration dates or times, limits on use, or the like, to determine whether any data elements, data sets, or the like, have expired, should be deleted, or the like. If so, the process may proceed to step 228 where the data control computing platform 110 may delete or remove data that is expired or otherwise violates any data use parameters, may generate another pre-fetch template to request updated data based on one or more data use parameters, or the like. Accordingly, data that is sensitive may be removed from a system after an expiration to avoid potential unauthorized access. Additionally or alternatively, by identifying (e.g., by the data controller 132a-132n) one or more data use parameters, the system may ensure that the most accurate or up-to-date data is being used in processing.

If no data use parameters are violated at step 227, the process may proceed to step 229 where the data control computing platform may process the received data or transmit the received data for further processing. In some examples, processing the data may include identifying missing data elements and/or missing data sets and accommodating the missing data. For instance, data control computing platform 110 may ignore any missing data elements or missing data sets, may insert a simulated or substitute value to replace missing data elements or missing data sets, or the like, and then further analyze or process the data. In some examples, processing the data may further include continuing to evaluate the received data for any data use parameters that have been violated (e.g., data is expired, data is beyond an identified use by date, or the like).

At step 230, the data control computing platform 110 may update or validate the machine learning model. For instance, data control computing platform 110 may update or validate the machine learning model based on response data sets received, identifying missing data elements or data sets, notifications received, and the like. Accordingly, the machine learning model may be continuously updated to improve accuracy in generating pre-fetch templates.

FIGS. 3A-3E depict another example illustrative event sequence for implementing data control functions in accordance with one or more aspects described herein. The events shown in the illustrative event sequence are merely one example sequence and additional events may be added, or events may be omitted, without departing from the invention. Further, one or more processes discussed with respect to FIGS. 3A-3E may be performed in real-time or near real-time.

With reference to FIG. 3A, at step 301, data control computing platform 110 may receive historical data request data. For instance, data control computing platform 110 may receive historical data associated with one or more data requests, data sets provided in response to the data request, types of data received, types of data not received, and the like.

At step 302, data control computing platform 110 may train a machine learning model. For instance, data control computing platform 110 may train a machine learning model using the received historical data. In some examples, labeled data indicating data sets received responsive to particular data requests, data types, and the like may be used to train the machine learning model.

At step 303, an internal entity computing system 120 of the enterprise organization may receive a request for data. For instance, internal entity computing system 120 which may execute or host one or more systems used in the course of business for the enterprise organization, may receive a request for data from a user (e.g., an employee of the enterprise organization). In some examples, the request for data may include requested types of data, date ranges, time ranges, categories of data, line of business associated with the data, and/or other parameters.

At step 304, internal entity computing system 120 may connect to data control computing platform 110. For instance, a first wireless connection may be established between internal entity computing system 120 and data control computing platform 110. Upon establishing the first wireless connection, a communication session may be initiated between internal entity computing system 120 and data control computing platform 110.

At step 305, internal entity computing system 120 may transmit the received request for data to the data control computing platform 110. For instance, internal entity computing system 120 may transmit the request for data during the communication session initiated upon establishing the first wireless connection.

With reference to FIG. 3B, at step 306, data control computing platform 110 may receive the request for data sent by the internal entity computing system 120.

At step 307, data control computing platform 110 may execute a pre-fetch engine. For instance, similar to steps 207-209 in FIG. 2B, data control computing platform 110 may execute a pre-fetch engine which may cause parameters of the request for data (e.g., data types, date ranges, and the like) to be input into the machine learning model. The pre-fetch engine may work in conjunction with the machine learning model to generate a pre-fetch template identifying data sets, data elements, and the like, that may be pre-fetched to reduce computing resources in retrieving the requested data. In some examples, the pre-fetch engine may identify one or more data repositories from which the data should be retrieved. The pre-fetch engine may then cause execution of the machine learning model to process the inputs to output a generated pre-fetch template at step 308. The pre-fetch template may identify data sets, data elements, or the like, responsive to the request for data.

At step 309, data control computing platform 110 may connect to data repository 130a. For instance, a second wireless connection may be established between data control computing platform 110 and data repository 130a. Upon establishing the second wireless connection, a communication session may be initiated between data control computing platform 110 and data repository 130a.

At step 310, data control computing platform 110 may connect to data repository 130b. For instance, a third wireless connection may be established between data control computing platform 110 and data repository 130b. Upon establishing the third wireless connection, a communication session may be initiated between data control computing platform 110 and data repository 130b.

Although connections to two data repositories are shown, more or fewer connections to more or fewer data repositories may be established without departing from the invention.

Figure 3C:
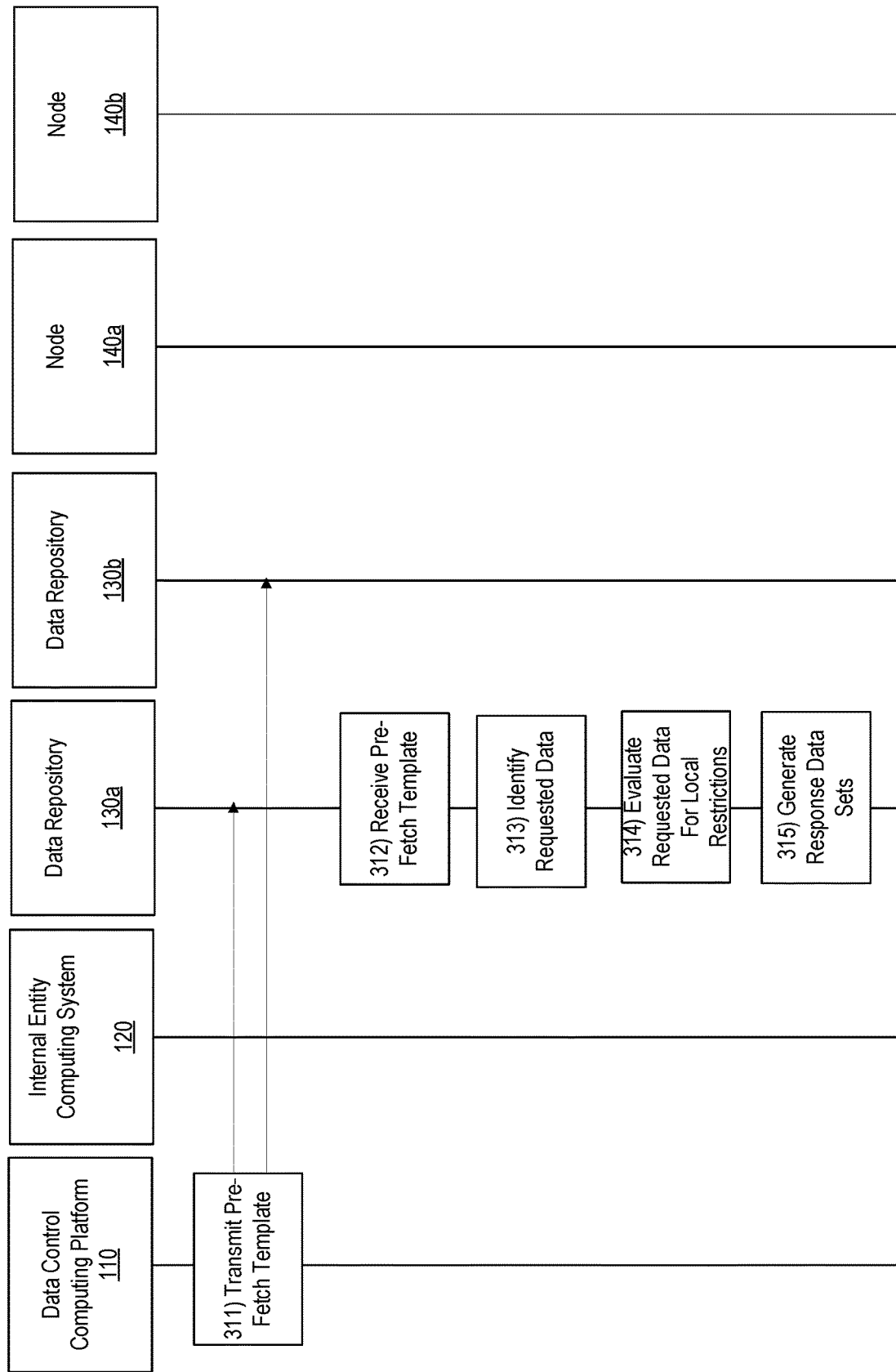

With reference to FIG. 3C, at step 311, the data control computing platform 110 may transmit or send the generated pre-fetch template to the data repositories 130a, 130b. For instance, the data control computing platform 110 may transmit or send the pre-fetch template to data repository 130a during the communication session initiated upon establishing the second wireless connection and to data repository 130b during the communication session initiated upon establishing the third wireless connection.

At step 312, data repository 130a may receive the pre-fetch template and may execute one or more instructions or commands in response to receiving the pre-fetch template.

For instance, at step 313, data repository 130a may identify one or more data sets, data elements, or the like, identified in the pre-fetch template that may be responsive to the data request.

At step 314, a data controller 132a associated with data repository 130a may evaluate the identified data based on one or more rules, regulations, or the like, that may control data transmission, data use, and the like. As discussed, the data controller 132a may store rules, regulations, and the like, particular to a geographic location or region associated with the data repository. Accordingly, local rules and regulations may be applied to the identified data to determine whether any data transmission restrictions are required, whether an expiration date of any data sets or data elements should be set, or the like.

At step 315, data repository 130a (e.g., via data controller 132a) may generate one or more response data sets. In some examples, the response data sets may include data that meets regulatory or local rules or criteria for transmission from the location of the data repository 130a (e.g., local rules of the geographic location or region of the data repository 130a) the destination (e.g., based on the evaluation performed at step 314). Accordingly, in some examples, all responsive data might not be used to generate the response data sets and, instead, only data meeting rules or requirements (e.g., a subset or less than all of the responsive data) to be transmitted may be used to generate the response data sets. In some examples, the data controller 132a may mark or flag data within the response data sets with an expiration date or time, date or time after which the data should not be used in processing, or the like. This mark or flag may be transmitted with the data.

Figure 3D:
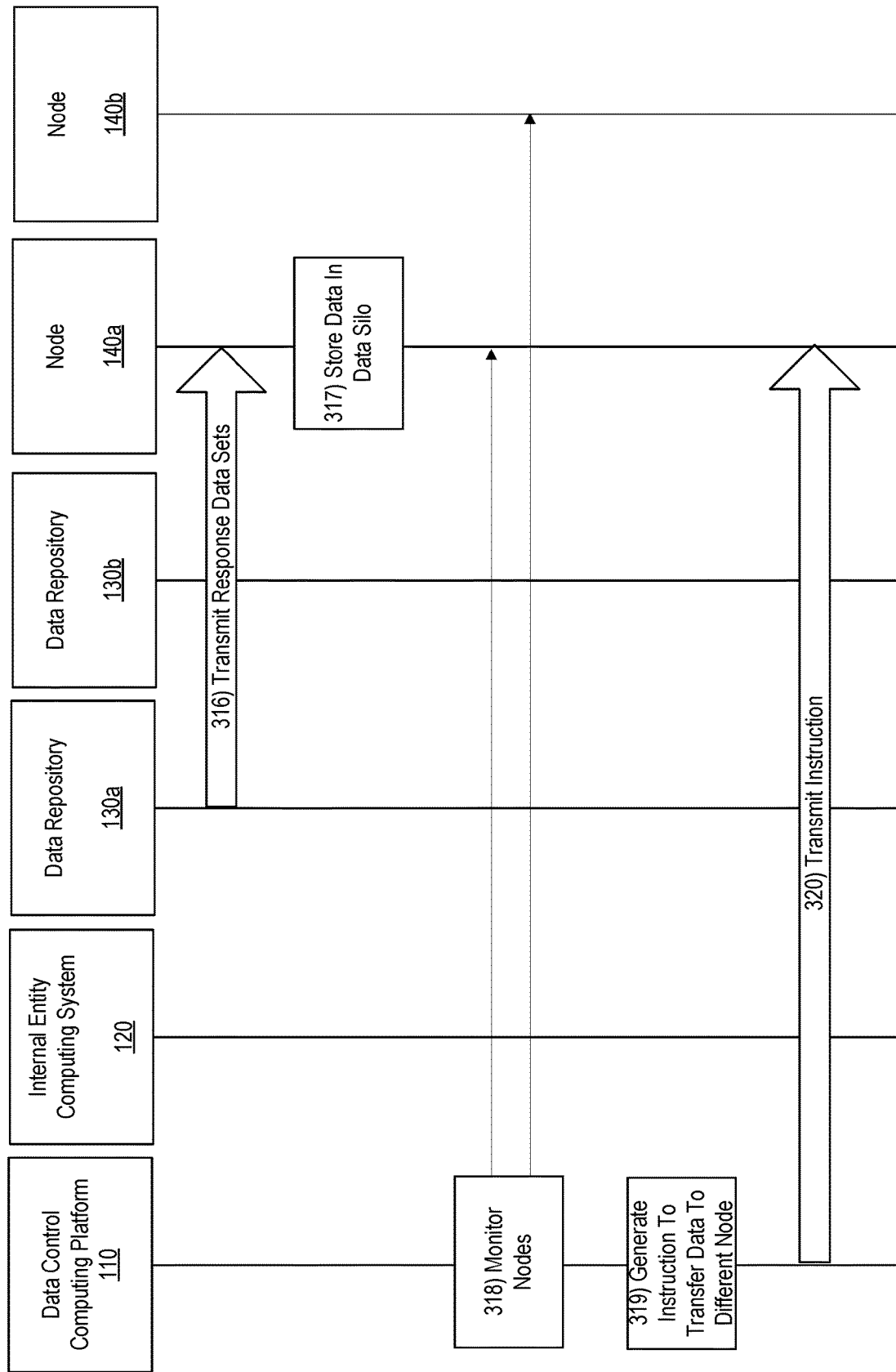

With reference to FIG. 3D, at step 316, the data repository 130a may transmit or send (e.g., via the mesh network 190) the generated response data sets to a first node 140a of the mesh network 190. For instance, the generated response data sets may be transmitted by the data repository 130a to the data control computing platform 110 via one or more nodes 140a-140n in the mesh network 190. In transmitting or sending the data, the generated response data sets may be sent to the first node 140a.

At step 317, node 140a may store, stage or hold the response data sets in a data silo 142a (not shown in FIG. 3D). For instance, data control computing platform 110 may, at step 318, monitor the nodes 140a-140n in the mesh network to evaluate a status of each node, bandwidth for transmission, and the like. Based on the monitoring, one or more nodes through which the data may pass or be transmitted may be identified. Accordingly, node 140a may store, stage or hold the response data sets in a data silo 142a pending identification of a next node for transmission, a path of nodes for transmission, or the like.

At step 319, based on the data control computing platform 110 monitoring nodes 140a and 140b, data control computing platform 110 may generate an instruction to transfer the response data sets from the data silo 142a of node 140a to a different node. In some examples, the instruction may include identification of one or more nodes for subsequent transmission.

At step 320, data control computing platform 110 may transmit or send the instruction to node 140a.

Figure 3E:
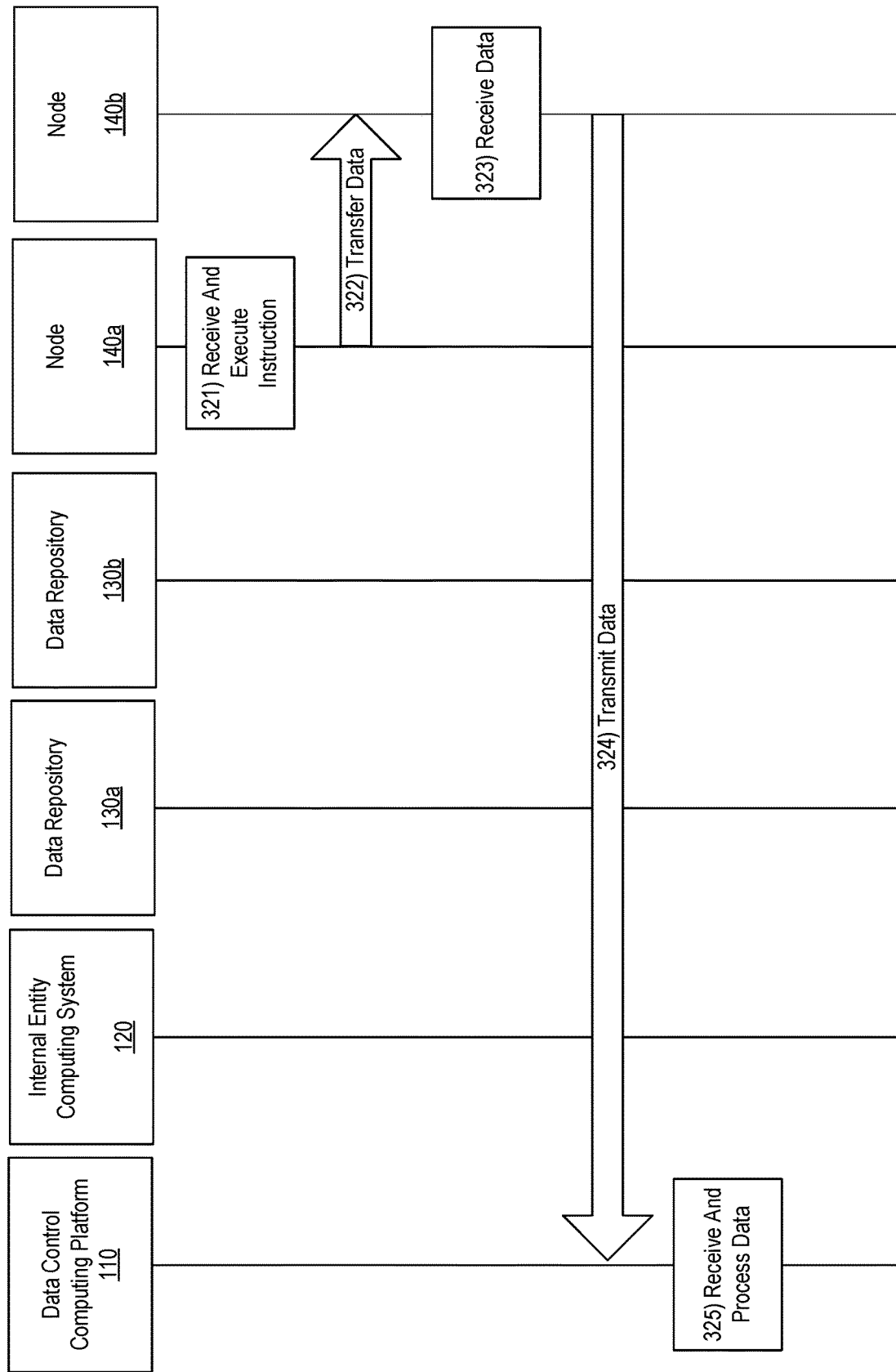

With reference to FIG. 3E, at step 321, node 140a may receive and execute the instruction transmitted by the data control computing platform 110. For instance, node 140a may receive the instruction and execute the instruction, causing node 140a to retrieve data from the data silo 142a and transmit the data to a next node in a transmission path (e.g., as identified or indicated in the instruction).

At step 322, based on executing the received instruction, node 140a may transmit or send the response data sets that were stored, staged or held in the data silo 142a to node 140b. At step 323, node 140b may receive the response data sets and may transmit the data to the data control computing platform 110 at step 324. Although FIG. 3E shows data being received by node 140b and transmitted to data control computing platform 110, in some examples, the data may be stored, staged or held in a data silo 142b at node 140b before being transmitted to one or more other nodes in the mesh network or to the data control computing platform 110.

At step 325, data control computing platform 110 may receive the response data sets sent by node 140b and may process the data as discussed more fully here (e.g., evaluate data use parameters, evaluate source for additional security measures, evaluate data for expiration, and the like).

Figure 4:
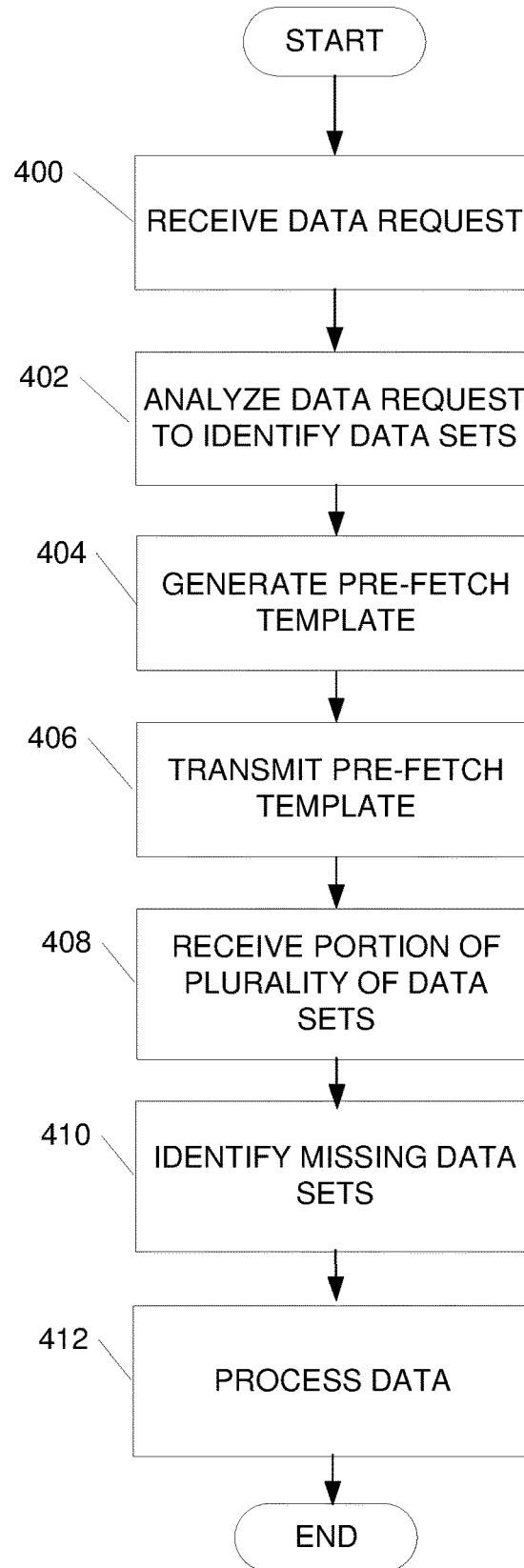
FIGS. 4-7 illustrate illustrative methods for implementing data control functions according to one or more aspects described herein.

FIG. 4 is a flow chart illustrating one example method of implementing data control functions using a pre-fetch engine in accordance with one or more aspects described herein. The processes illustrated in FIG. 4 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 4 may be performed in real-time or near real-time.

At step 400, a request for data may be received. For instance, a request for data may be received by data control computing platform 110 from one or more internal entity computing systems (e.g., internal entity computing system 120) or other computing devices or systems. The request for data may include one or more data types, date ranges, categories of data, or the like.

At step 402, data control computing platform 110 may analyze the data to identify one or more responsive data sets. For instance, a pre-fetch engine of the data control computing platform 110 may be executed which may cause execution of a machine learning model. The machine learning model may use, as inputs, the data request, data types, date ranges, categories, or the like, to generate or output a pre-fetch template at step 404. In some examples, the pre-fetch engine may include identification of a plurality of data sets responsive to the data request.

At step 406, data control computing platform 110 may transmit or send the generated pre-fetch template to one or more data repositories 130a-130n. For instance, the data control computing platform 110 may transmit or send the pre-fetch template to one or more data repositories 130a-130n in one or more geographic locations (e.g., geographic physical location of the data repository which may, e.g., correspond to a geographic location or region associated with the data stored therein, a geographic location or region in which the data was generated or captured, or the like). The data repositories 130a-130n may include data responsive to the request for data.

At step 408, data control computing platform 110 may receive, from, for instance, a first data repository 130a, a portion of the plurality of data sets identified in the pre-fetch template. In some examples, the portion of the plurality of data sets may be fewer than all data sets in the plurality of data sets (e.g., additional data sets may be received from other data repositories, or data sets might not be received). In some examples, the portion of the plurality of data sets may be identified by a first data controller 132a associated with the first data repository 130a. The first data controller may analyze the pre-fetch template, identify and retrieve data stored at the first data repository that corresponds to data sets identified in the pre-fetch template and may analyze the identified or retrieved data to determine whether the data sets identified or retrieved comply with transmission requirements of the location of the first data repository. For instance, first data controller 132a may determine whether each data set meets any transmission requirements associated with the location, such as restrictions on timing for data being transmitted, restrictions on types of data that may be transmitted from the geographic location to another geographic location, and the like. Based on the analysis performed by the data controller, response data sets (e.g., a portion of the plurality of data sets) may be generated, transmitted by the data repository 130a to the data control computing platform 110 and received by the data control computing platform 110 at step 408. In some examples, receiving the portion of the plurality of data sets may cause the data control computing platform 110 to update or validate the machine learning model executed by the pre-fetch engine. Accordingly, the model may be continuously updated to improve accuracy in generating pre-fetch templates.

At step 410, data control computing platform 110 may analyze the received portion of the plurality of data sets to identify any missing data sets or data elements. For instance, if additional data sets were received from another data repository, such as data repository 130b, those data sets may be aggregated with the data sets from the first data repository 130a. In another example, if the received data sets are missing one or more data elements or data sets (e.g., based on what was requested via the pre-fetch template), missing data elements or data sets may be identified.

At step 412, the data control computing platform 110 may process the received data sets. In some examples, processing the received data sets may include ignoring any identified missing data elements or data sets, entering a simulated or substitute value for the identified missing data elements or data sets, or the like.

Figure 5:
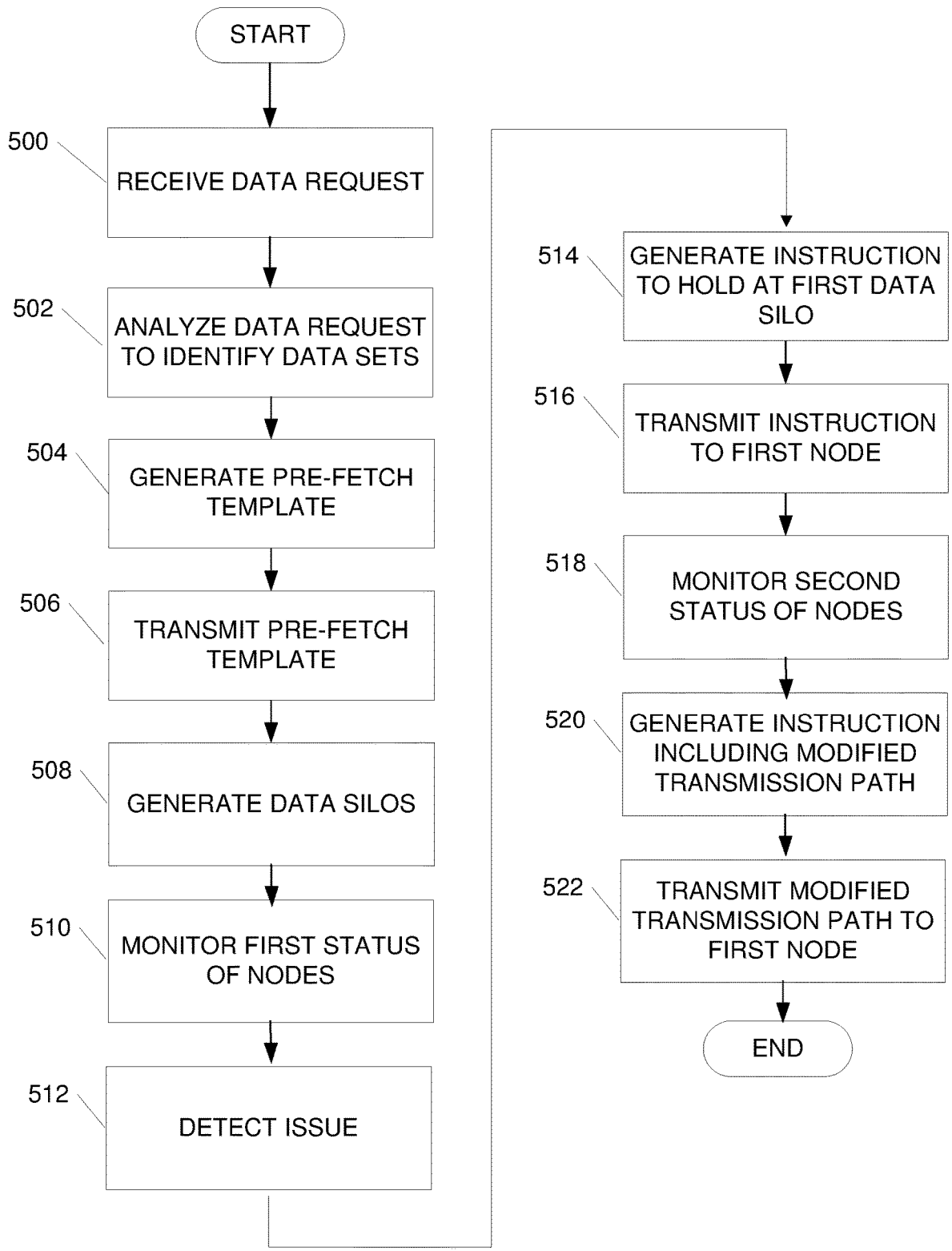

FIG. 5 is a flow chart illustrating another example method of implementing data control functions using a pre-fetch engine in accordance with one or more aspects described herein. The processes illustrated in FIG. 5 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 5 may be performed in real-time or near real-time.

At step 500, a request for data may be received. For instance, a request for data may be received by data control computing platform 110 from one or more internal entity computing systems (e.g., internal entity computing system 120) or other computing devices or systems. The request for data may include one or more data types, date ranges, categories of data, or the like.

At step 502, data control computing platform 110 may analyze the data to identify one or more responsive data sets. For instance, a pre-fetch engine of the data control computing platform 110 may be executed which may cause execution of a machine learning model. The machine learning model may use, as inputs, the data request, data types, date ranges, categories, or the like, to generate or output a pre-fetch template at step 504. In some examples, the pre-fetch engine may include identification of a plurality of data sets responsive to the data request.

At step 506, data control computing platform 110 may transmit or send the generated pre-fetch template to one or more data repositories 130a-130n (e.g., via the mesh data transmission network 190). For instance, the data control computing platform 110 may transmit or send the pre-fetch template to one or more data repositories 130a-130n in one or more geographic locations (e.g., geographic physical location of the data repository which may, e.g., correspond to a geographic location or region associated with the data stored therein, a geographic location or region in which the data was generated or captured, or the like). The data repositories 130a-130n may include data responsive to the request for data. In some examples, a data controller 132a-132n associated with each data repository 130a-130n may evaluate the pre-fetch template, identify responsive data and generate one or more response data sets for transmission to the data control computing platform 110 via the mesh data transmission network.

At step 508, one or more data silos or micro silos 142a-142n may be generated. In some examples, a data silo may be generated at each node of the plurality of nodes within the mesh data transmission network. As discussed herein, the data silos may be used to hold, stage or store data at a respective node.

At step 510, data control computing platform 110 may monitor a first status of the plurality of nodes in the mesh data transmission network. For instance, a status of each node may be monitored on a continuous or near-continuous basis to determine whether data should be held in a data silo prior to transmission to a subsequent node, whether a modified transmission path should be generated, or the like.

At step 512, based on the monitoring of the first status of the plurality of nodes, data control computing platform 110 may detect an issue with a node of the plurality of nodes. For instance, as response data sets are transmitted from the data repository 130a to the data control computing platform 110 through the mesh data transmission network, data control computing platform 110 may detect an issue with one or more nodes in the network. In some examples, the detected issue may be with a node in the current transmission path. Accordingly, data control computing platform 110 may generate an instruction to hold the one or more data sets in a first data silo 142a of a first node 140a of the plurality of nodes of the mesh data transmission network at step 514.

At step 516, data control computing platform 110 may transmit or send, to the first node 140a, the generated instruction to hold the one or more response data sets. In some examples, transmitting the instruction may cause the first node 140*a* to store the one or more data sets in the first data silo 142*a* associated with the first node 140*a*.

At step 518, data control computing platform 110 may monitor a second status of the plurality of nodes in the mesh data transmission network. In some examples, the second status may be monitored at a time subsequent to the monitoring of the first status.

At step 520, based on the monitoring of the second status of the plurality of nodes, the data control computing platform 110 may generate an instruction including a modified transmission path for the one or more data sets. In some examples, the modified transmission path may include at least a second node to which the one or more data sets should be transferred from the first data silo 142*a* of the first node 140*a*. In some examples, the second node may be the computing platform 110.

At step 522, data control computing platform 110 may transmit or send, to the first node, the instruction including the modified transmission path. In some examples, transmitting or sending the modified transmission path may cause the first node to transfer the one or more data sets from the first data silo 142*a* of the first node 140*a* to the at least a second node. In some examples, the modified transmission path may include an instruction to hold the one or more data sets at the second node (e.g., before transmission to another node, while awaiting a further modified transmission path generated based on subsequent monitoring of the status of the nodes, or the like).

Figure 6:
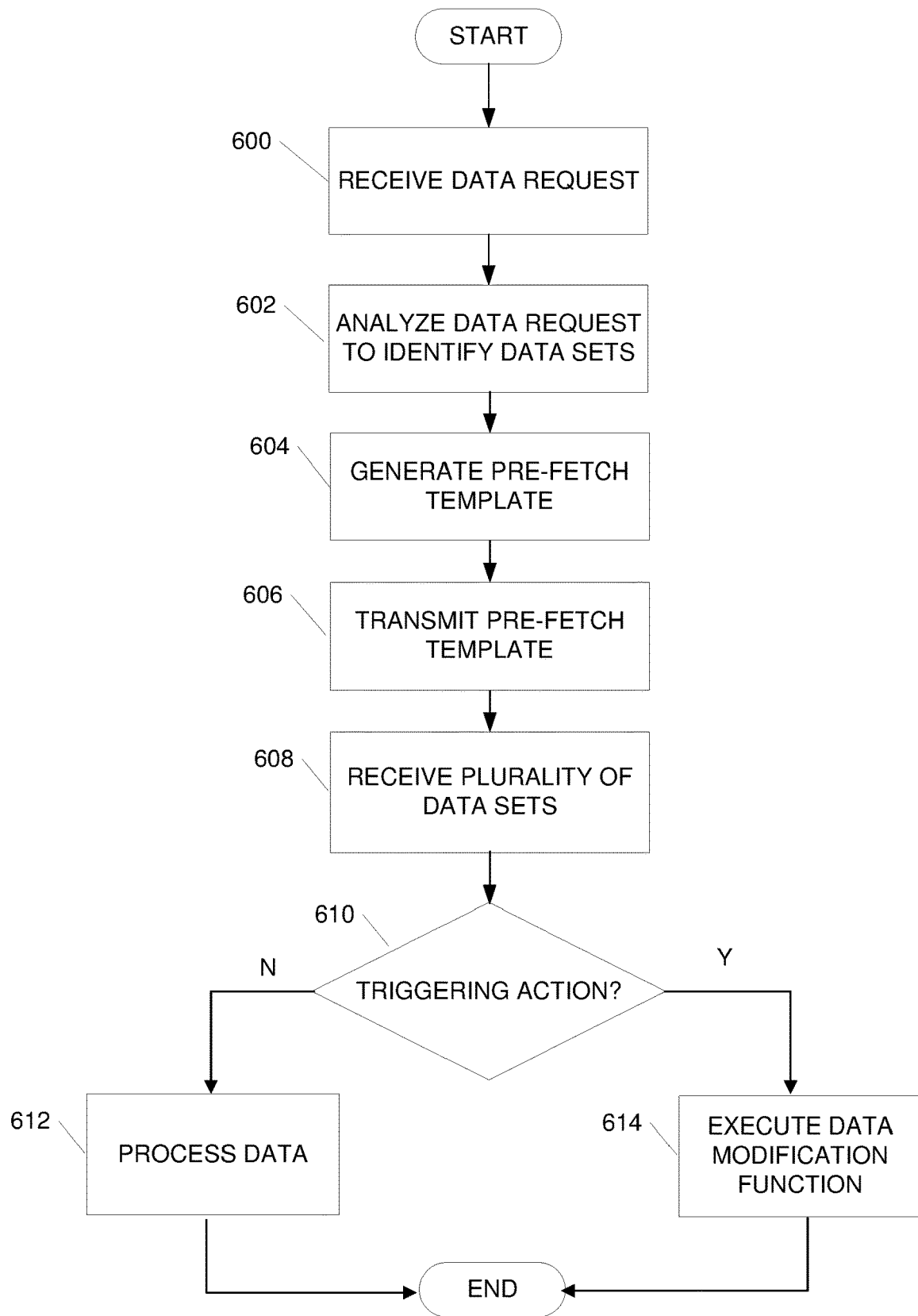

FIG. 6 is a flow chart illustrating another example method of implementing data control functions using a pre-fetch engine in accordance with one or more aspects described herein. The processes illustrated in FIG. 6 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 6 may be performed in real-time or near real-time.

At step 600, a request for data may be received. For instance, a request for data may be received by data control computing platform 110 from one or more internal entity computing systems (e.g., internal entity computing system 120) or other computing devices or systems. The request for data may include one or more data types, date ranges, categories of data, or the like.

At step 602, data control computing platform 110 may analyze the data to identify one or more responsive data sets. For instance, a pre-fetch engine of the data control computing platform 110 may be executed which may cause execution of a machine learning model. The machine learning model may use, as inputs, the data request, data types, date ranges, categories, or the like, to generate or output a pre-fetch template at step 604. In some examples, the pre-fetch engine may include identification of a plurality of data sets responsive to the data request.

At step 606, data control computing platform 110 may transmit or send the generated pre-fetch template to one or more data repositories 130*a*-130*n* (e.g., via the mesh data transmission network 190). For instance, the data control computing platform 110 may transmit or send the pre-fetch template to one or more data repositories 130*a*-130*n* in one or more geographic locations (e.g., geographic physical location of the data repository which may, e.g., correspond to a geographic location or region associated with the data stored therein, a geographic location or region in which the data was generated or captured, or the like). The data repositories 130*a*-130*n* may include data responsive to the request for data. In some examples, a data controller 132*a*-132*n* associated with each data repository 130*a*-130*n* may evaluate the pre-fetch template, identify responsive data and generate one or more response data sets for transmission to the data control computing platform 110 via the mesh data transmission network.

In some examples, in generating the response data sets, the respective data controller may identify one or more data use parameters associated with each data set. For instance, the data controller may identify an expiration date of a data set, a date after which the data must be re-requested (e.g., re-fetched) from the respective data repository, a date after which the data should no longer be used in processing, or the like. In some examples, the data use parameters may be determined based on a geographic location (e.g., geographic physical location) of the respective data repository (e.g., to implement local regulations and requirements). In some examples, the data use parameters may include a data modification function that should be executed upon detection of a triggering action. For instance, if data is expired, the data modification function may be identified as deleting the data. In another example, if data should no longer be used in data processing functions after a certain date (e.g., but does not need to be deleted), the data may be flagged as ineligible for processing upon detection of the triggering action. Various other data modification functions may be identified without departing from the invention.

At step 608, data control computing platform 110 may receive the plurality of data sets (e.g., response data sets) from one or more data repositories of the plurality of data repositories 130*a*-130*n*. In some examples, the data sets may be received from the plurality of data repositories 130*a*-130*n*. In some arrangements, each data set of the plurality of data sets may include data use parameters for a respective data set. For instance, an expiration date, or the like, of the respective data set may be received with the respective data set.

At step 610, the data use parameters of the received data sets may be analyzed to determine whether a triggering action has occurred. For instance, a respective data set may be analyzed to determine whether a triggering action, such as reaching or surpassing an expiration date of the data set, has occurred.

If, at step 610, a triggering action has not occurred, at step 612, the received data set may be processed by data control computing platform 110.

If, at step 610, a triggering action has occurred, at step 614, a data modification action may be executed. For instance, if the data is to be deleted after an expiration date, a data deletion function may be executed. In another example, if the data is to be re-requested or re-fetched from the respective data repository after a certain data, the data request function may be executed.

Figure 7:
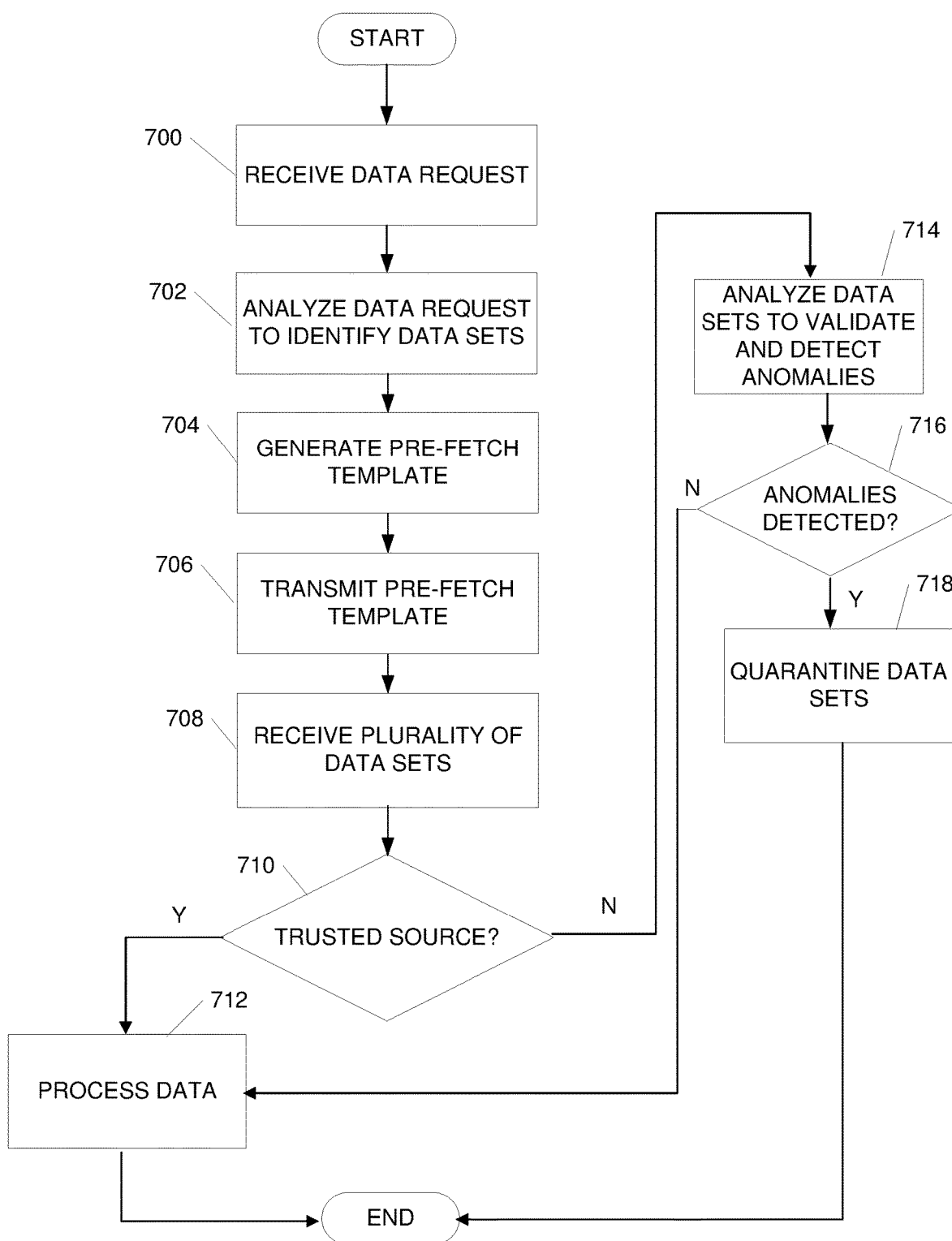

FIG. 7 is a flow chart illustrating another example method of implementing data control functions using a pre-fetch engine in accordance with one or more aspects described herein. The processes illustrated in FIG. 7 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 7 may be performed in real-time or near real-time.

At step 700, a request for data may be received. For instance, a request for data may be received by data control computing platform 110 from one or more internal entity computing systems (e.g., internal entity computing system 120) or other computing devices or systems. The request for data may include one or more data types, date ranges, categories of data, or the like.

At step 702, data control computing platform 110 may analyze the data to identify one or more responsive data sets. For instance, a pre-fetch engine of the data control computing platform 110 may be executed which may cause execution of a machine learning model. The machine learning model may use, as inputs, the data request, data types, date ranges, categories, or the like, to generate or output a pre-fetch template at step 704. In some examples, the pre-fetch engine may include identification of a plurality of data sets responsive to the data request.

At step 706, data control computing platform 110 may transmit or send the generated pre-fetch template to one or more data repositories 130a-130n (e.g., via the mesh data transmission network 190). For instance, the data control computing platform 110 may transmit or send the pre-fetch template to one or more data repositories 130a-130n in one or more geographic locations (e.g., geographic physical location of the data repository which may, e.g., correspond to a geographic location or region associated with the data stored therein, a geographic location or region in which the data was generated or captured, or the like). The data repositories 130a-130n may include data responsive to the request for data. In some examples, a data controller 132a-132n associated with each data repository 130a-130n may evaluate the pre-fetch template, identify responsive data and generate a plurality of response data sets for transmission to the data control computing platform 110 via the mesh data transmission network.

At step 708, data control computing platform 110 may receive the plurality of data sets (e.g., response data sets) from at least one data repository of the plurality of data repositories 130a-130n. In some examples, the data sets may be received from the plurality of data repositories 130a-130n. In other examples, the plurality of data sets may be received from one data repository.

At step 710, the data repository from which the plurality of data sets was received (e.g., data associated with a first data repository, or the like) may be analyzed to determine whether the data repository is a trusted source. For instance, the source data repository may be analyzed to determine whether it is a data repository internal to, part of or associated with the enterprise organization implementing the data control computing platform 110. If so, the data repository may be considered a trusted source. In some examples, a trusted source may include a data repository external to the enterprise organization but identified by the enterprise organization as trusted or identified as trusted based on historical data received from the data repository. If the data repository is external to (e.g., a third party source, a vendor source, or the like), the data repository may be considered an untrusted source.

Accordingly, if, at step 710, the data repository from which the plurality of data sets was received is a trusted source, data control computing platform 110 may process the received plurality of data sets at step 712.

If, at step 710, the data repository is not considered a trusted source or is an untrusted source, at step 714, the plurality of data sets may be validated and analyzed to determine whether any anomalies exist in the plurality of data sets. For instance, the plurality of data sets may be scanned to detect any viruses, malware, or the like, in one or more data sets of the plurality of data sets.

At step 716, a determination may be made as to whether the data is validated and no anomalies exists or whether anomalies exist in the plurality of data sets. In some examples, a data controller associated with the computing platform 110 may analyze the data to detect any anomalies. If no anomalies exist, the process may proceed to step 712 where data control computing platform 110 may process the plurality of data sets.

If, at step 716, an anomaly is detected, the received plurality of data sets may be quarantined and further analyzed to determine potential impact of the anomaly, any mitigating actions that may be executed, and the like.

In some examples, the machine learning model may be updated or validated based on the received plurality of data sets, the outcome of the validation and anomaly detection process, and the like. Accordingly, the machine learning model may continuously improve accuracy and additional trusted sources may be identified based on, for instance, the evaluation of data from sources.

Accordingly, aspects described herein address issues with latency associated with data retrieval across multiple data sources in multiple locations or regions, while ensuring data transmission complies with local regulatory requirements associated with the data in various regions or locations. The arrangements rely on machine learning and other intelligent processes to identify data sets that may be pre-fetched to reduce an amount of data being transmitted and rely on a mesh data transmission network to ensure efficient paths of transmission for data.

Accordingly, aspects described herein include a pre-fetch engine that intelligently identifies data sets responsive to a request for data and transmits a pre-fetch template, including the identified data sets, to one or more data repositories. In some examples, the data repositories may be located in different geographic regions or locations. In some arrangements, each data repository may include a data controller that analyzes the pre-fetch template to retrieve data stored at the respective data repository, identifies any data use parameters for the data sets, and ensures that the data sets or elements comply with local regulatory requirements. In some examples, the data controller may control sizing of data being transmitted to further reduce latency when transmitting data, particularly, between geographic regions.

In some examples, a respective data controller may prevent data from being transmitted in response to a pre-fetch template, may redact a portion of the requested data, may hide data, may encrypt data, or the like. In some examples, the data controller may hold data until a time trigger is reached (e.g., if a location requires data to be held in the location for a predetermined time (e.g., 24 hours, or the like). For instance, a first region may have a particular payment code that is used in processing payments. In some examples, the payment data may be transmitted in response to receipt of a pre-fetch template. However, local regulations might not permit transmission of the payment code. Accordingly, a respective data controller may redact the payment code from the response data sets or may encrypt the payment code so that the recipient cannot access the payment code.

Additional aspects described herein are directed to use of data silos or micro silos within the mesh data transmission network. In some examples, each node of the mesh network may include a data silo. Accordingly, data may be siloed at any node in the mesh network and held, redirected to another node (e.g., an alternate or modified transmission path), or the like.

Accordingly, data silos may be used to stage or hold data when transferring data between systems having different processing speeds. For instance, if a source system has a faster processing speed than a destination system, data might not be received by the destination system quickly enough and errors may occur. Accordingly, portions of the data may be held at one or more data silos at nodes along the transmission path to regulate the data flow to accommodate the slower processing speed.

In another example, issues in a transmission path may be detected and data or portions of data may be siloed to identify an alternate transmission path and cause transmission of the data via the alternate path.

In still other examples, data may be siloed according to data requested via the pre-fetch template. For instance, data may be processed beginning at a first time. However, the pre-fetch template may request two hours of data. Accordingly, a first hour of data may be generated for the first time and held in a data silo until the second hour of data is generated.

Further, additional aspects described herein are directed to control of storage and timing of data. For instance, data use parameters, such as an expiration date, may be set by a data controller, data control computing platform or the like. In some examples, data might no longer be accurate after a period of time (e.g., after 24 hours). Accordingly, the data may have a 24 hour expiration date after which the data may be deleted, prevented from use in processing, or otherwise inaccessible. For instance, a flag or marker may be attached to data to ensure that data is not used or processed after an expiration date. In some examples, if a user attempts to process the data after the expiration date, an alert or notification may be generated and transmitted to a system administrator, user setting the expiration date, or the like. This may ensure that accurate data is used in processing and may also ensure deletion of sensitive data to avoid unauthorized access.

In some examples, a data use parameter may be set that permits data to be processed only one time. If a user attempts to process the data more than once, an alert to notification may be generated and transmitted to an administrator.

In some arrangements, the data use parameters may control when data may be initially accessed. For instance, a pre-fetch engine may request particular data sets or elements. Per local rules at which those data elements or sets are requested, the data might not be permitted to be accessed (e.g., outside the location) until a particular time. Accordingly, the data controller may encrypt the data and send it to the destination. However, the destination might not be able to decrypt or access the data until the particular time. Accordingly, the data may be available more quickly (e.g., right at the particular time at which the user may access it) rather that waiting to have the data sent at the available time, which then may cause delays for the data to be transmitted.

Still other aspects described herein are directed to additional security measures associated with processing data from external or untrusted sources. As discussed, data may be received from internal sources (e.g., trusted sources) and/or external sources (e.g., untrusted sources). The external sources might not permit a data controller of the enterprise organization to be installed on the external data source. Accordingly, an edge-based data controller may be used. The data may be transmitted from the external source to the requesting destination (e.g., data control computing platform) but may be analyzed by the edge-based data controller on the mesh data transmission network prior to being received by the destination. Accordingly, the edge-based data controller may evaluate the data for local regulations, may validate the data (e.g., by cross linking data with data from trusted sources), may scan the data for malware, and the like.

Figure 8:
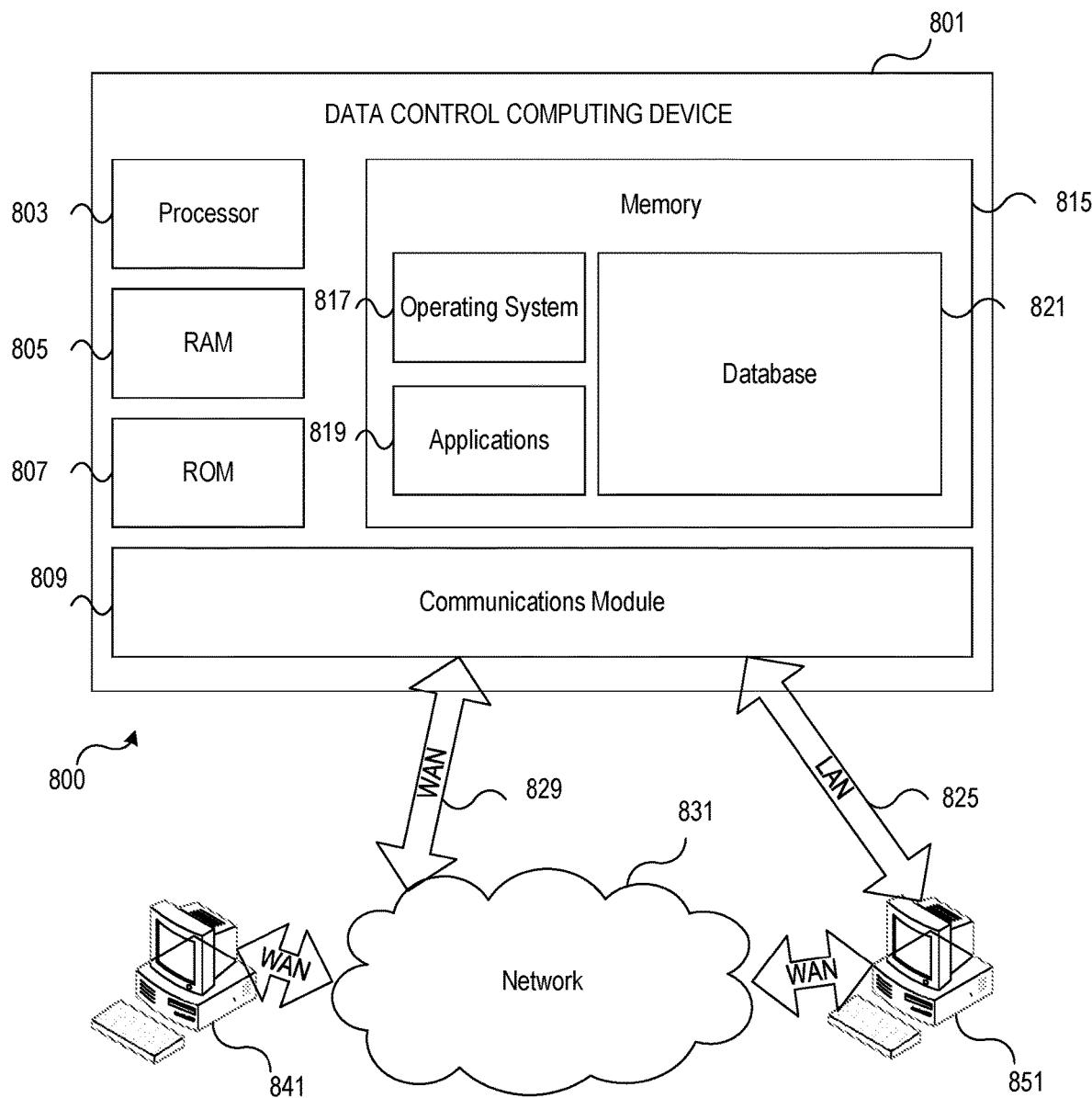
FIG. 8 illustrates one example environment in which various aspects of the disclosure may be implemented in accordance with one or more aspects described herein.

FIG. 8 depicts an illustrative operating environment in which various aspects of the present disclosure may be implemented in accordance with one or more example embodiments. Referring to FIG. 8, computing system environment 800 may be used according to one or more illustrative embodiments. Computing system environment 800 is only one example of a suitable computing environment and is not intended to suggest any limitation as to the scope of use or functionality contained in the disclosure. Computing system environment 800 should not be interpreted as having any dependency or requirement relating to any one or combination of components shown in illustrative computing system environment 800.

Computing system environment 800 may include data control computing device 801 having processor 803 for controlling overall operation of data control computing device 801 and its associated components, including Random Access Memory (RAM) 805, Read-Only Memory (ROM) 807, communications module 809, and memory 815. Data control computing device 801 may include a variety of computer readable media. Computer readable media may be any available media that may be accessed by data control computing device 801, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by data control computing device 801.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on data control computing device 801. Such a processor may execute computer-executable instructions stored on a computer-readable medium.

Software may be stored within memory 815 and/or storage to provide instructions to processor 803 for enabling data control computing device 801 to perform various functions as discussed herein. For example, memory 815 may store software used by data control computing device 801, such as operating system 817, application programs 819, and associated database 821. Also, some or all of the computer executable instructions for data control computing device 801 may be embodied in hardware or firmware. Although not shown, RAM 805 may include one or more applications representing the application data stored in RAM 805 while data control computing device 801 is on and corresponding software applications (e.g., software tasks) are running on data control computing device 801.

Communications module 809 may include a microphone, keypad, touch screen, and/or stylus through which a user of data control computing device 801 may provide input, and may also include one or more of a speaker for providing audio output and a video display device for providing textual, audiovisual and/or graphical output. Computing system environment 800 may also include optical scanners (not shown).

Data control computing device 801 may operate in a networked environment supporting connections to one or more remote computing devices, such as computing device 841 and 851. Computing devices 841 and 851 may be personal computing devices or servers that include any or all of the elements described above relative to data control computing device 801.

The network connections depicted in FIG. 8 may include Local Area Network (LAN) 825 and Wide Area Network (WAN) 829, as well as other networks. When used in a LAN networking environment, data control computing device 801 may be connected to LAN 825 through a network interface or adapter in communications module 809. When used in a WAN networking environment, data control computing device 801 may include a modem in communications module 809 or other means for establishing communications over WAN 829, such as network 831 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   a memory storing computer-readable instructions that, when executed by the at least one processor, cause the computing platform to:
      train a machine learning model to identify patterns or sequences in data to identify, based on requested data inputs, data sets responsive to data requests;
      receive a data request;

analyze, using the machine learning model executed by a pre-fetch engine, the data request to identify a plurality of data sets responsive to the data request;

generate, based on the analyzing, a pre-fetch template including the identified plurality of data sets and including a mapping of particular data sets to particular data repositories;

transmit, to a plurality of data repositories and via a mesh data transmission network having a plurality of nodes and each node including a data silo, the pre-fetch template, wherein each data repository is associated with a different geographic region and wherein transmitting the pre-fetch template includes:

transmitting, to a first node in the mesh data transmission network, the pre-fetch template, wherein the first node is a node in a first transmission path;

monitoring transmission rates for the plurality of nodes within the mesh data network;

detecting, based on the monitoring, an issue with transmission rates of one or more nodes in the first transmission path;

modifying, based on the detected issue, the first transmission path to a second transmission path; and transmitting, from the first node in the first transmission path, the pre-fetch template to a second node in the second transmission path;

receive, from the plurality of data repositories and based on the mapping, the plurality of data sets, wherein each data set of the plurality of data sets includes data use parameters for a respective data set;

analyze the data use parameters for each data set to determine whether a triggering action has occurred for the respective data set;

responsive to determining that the triggering action for the respective data set has not occurred, process the respective data set; and responsive to determining that the triggering action for the respective data set has occurred, execute a data modification function on the respective data set.

2. The computing platform of claim 1, wherein the data use parameters include an expiration date for the respective data set.

3. The computing platform of claim 2, wherein the triggering action includes determining that the respective data set has reached or surpassed the expiration date for the respective data set.

4. The computing platform of claim 1, wherein the data modification function includes deleting the respective data set.

5. The computing platform of claim 1, wherein the data modification function includes an instruction to receive updated data sets from at least one data repository of the plurality of data repositories.

6. The computing platform of claim 1, wherein the data use parameters for the respective data set are determined by a data controller associated with a data repository of the plurality of data repositories.

7. The computing platform of claim 6, wherein the data use parameters are determined by the data controller based on a respective geographic location of the data repository.

8. A method, comprising:

training, by a computing platform, the computing platform having at least one processor and memory, a machine learning model to identify patterns or sequences in data to identify, based on requested data inputs, data sets responsive to data requests;

receiving, by the at least one processor, a data request;

analyzing, by the at least one processor and using the machine learning model executed by a pre-fetch engine, the data request to identify a plurality of data sets responsive to the data request;

generating, by the at least one processor and based on the analyzing, a pre-fetch template including the identified plurality of data sets and including a mapping of particular data sets to particular data repositories;

transmitting, by the at least one processor and to a plurality of data repositories and via a mesh data transmission network having a plurality of nodes and each node including a data silo, the pre-fetch template, wherein each data repository is associated with a different geographic region and wherein transmitting the pre-fetch template includes:

transmitting, to a first node in the mesh data transmission network, the pre-fetch template, wherein the first node is a node in a first transmission path;

monitoring transmission rates for the plurality of nodes within the mesh data network;

detecting, based on the monitoring, an issue with transmission rates of one or more nodes in the first transmission path;

modifying, based on the detected issue, the first transmission path to a second transmission path; and transmitting, from the first node in the first transmission path, the pre-fetch template to a second node in the second transmission path;

receiving, by the at least one processor and from the plurality of data repositories based on the mapping, the plurality of data sets, wherein each data set of the plurality of data sets includes data use parameters for a respective data set;

analyzing, by the at least one processor, the data use parameters for each data set to determine whether a triggering action has occurred for the respective data set;

responsive to determining that the triggering action for the respective data set has not occurred, processing, by the at least one processor, the respective data set; and responsive to determining that the triggering action for the respective data set has occurred, executing, by the at least one processor, a data modification function on the respective data set.

9. The method of claim 8, wherein the data use parameters include an expiration date for the respective data set.

10. The method of claim 9, wherein the triggering action includes determining that the respective data set has reached or surpassed the expiration date for the respective data set.

11. The method of claim 8, wherein the data modification function includes deleting the respective data set.

12. The method of claim 8, wherein the data modification function includes an instruction to receive updated data sets from at least one data repository of the plurality of data repositories.

13. The method of claim 8, wherein the data use parameters for the respective data set are determined by a data controller associated with a data repository of the plurality of data repositories.

14. The method of claim 13, wherein the data use parameters are determined by the data controller based on a respective geographic location of the data repository.

15. One or more non-transitory computer-readable media storing instructions that, when executed by a computing platform comprising at least one processor, memory, and a communication interface, cause the computing platform to:

train a machine learning model to identify patterns or sequences in data to identify, based on requested data inputs, data sets responsive to data requests;

receive a data request;

analyze, using the machine learning model executed by a pre-fetch engine, the data request to identify a plurality of data sets responsive to the data request;

generate, based on the analyzing, a pre-fetch template including the identified plurality of data sets;

transmit, to a plurality of data repositories and via a mesh data transmission network having a plurality of nodes and each node including a data silo, the pre-fetch template, wherein each data repository is associated with a different geographic region and wherein transmitting the pre-fetch template includes:

transmitting, to a first node in the mesh data transmission network, the pre-fetch template, wherein the first node is a node in a first transmission path and wherein the pre-fetch template is held in a data silo of the first node;

monitoring transmission rates for the plurality of nodes within the mesh data network;

detecting, based on the monitoring, an issue with transmission rates of one or more nodes in the first transmission path;

modifying, based on the detected issue, the first transmission path to a second transmission path; and transmitting, from the first node in the first transmission path, the pre-fetch template to a second node in the second transmission path;

receive, from the plurality of data repositories, the plurality of data sets, wherein each data set of the plurality of data sets includes data use parameters for a respective data set;

analyze the data use parameters for each data set to determine whether a triggering action has occurred for the respective data set;

responsive to determining that the triggering action for the respective data set has not occurred, process the respective data set; and responsive to determining that the triggering action for the respective data set has occurred, execute a data modification function on the respective data set.

16. The one or more non-transitory computer-readable media of claim 15, wherein the data use parameters include an expiration date for the respective data set.

17. The one or more non-transitory computer-readable media of claim 16, wherein the triggering action includes determining that the respective data set has reached or surpassed the expiration date for the respective data set.

18. The one or more non-transitory computer-readable media of claim 15, wherein the data modification function includes deleting the respective data set.

19. The one or more non-transitory computer-readable media of claim 15, wherein the data modification function includes an instruction to receive updated data sets from at least one data repository of the plurality of data repositories.

20. The one or more non-transitory computer-readable media of claim 15, wherein the data use parameters for the respective data set are determined by a data controller associated with a data repository of the plurality of data repositories.

21. The one or more non-transitory computer-readable media of claim 20, wherein the data use parameters are determined by the data controller based on a respective geographic location of the data repository.

* * * * *